United States Patent [19]

Minamisawa

[11] Patent Number: 6,026,303
[45] Date of Patent: Feb. 15, 2000

[54] METHOD FOR DETERMINING OPTIMAL PARENT TERMINAL AND AD HOC NETWORK SYSTEM FOR THE SAME

[75] Inventor: Takeaki Minamisawa, Tokyo, Japan

[73] Assignee: NEC Corporation, Japan

[21] Appl. No.: 08/965,297

[22] Filed: Nov. 6, 1997

[30] Foreign Application Priority Data

Nov. 7, 1996 [JP] Japan ..................................... 8-295173
Nov. 22, 1996 [JP] Japan ..................................... 8-312480

[51] Int. Cl.[7] ...................................................... H04Q 7/00
[52] U.S. Cl. ............................ 455/446; 455/507; 455/524
[58] Field of Search .................................... 455/446, 455, 455/500, 501, 502, 503, 507, 524, 525, 31.1, 31.2, 32.1; 370/335, 344, 445, 329, 331

[56] References Cited

U.S. PATENT DOCUMENTS 5,551,066  8/1996  Stillman et al. ........................ 455/69
5,745,483  4/1998  Nakagawa et al. ...................... 370/335
5,774,461  6/1998  Hyden et al. ............................. 370/329
5,896,373  4/1999  Mitts et al. .............................. 370/331
5,898,904  4/1999  Wang ...................................... 455/31.3

Primary Examiner—Wellington Chin
Assistant Examiner—Congvan Tran
Attorney, Agent, or Firm—Ostrolenk, Faber, Gerb & Soffen, LLP

[57] ABSTRACT

In a method of configuring an ad hoc network system including a plurality of wireless terminals, at least one of a plurality of wireless terminals of a network is selected as a current temporary parent wireless terminal, all of the plurality of wireless terminals other than the current temporary parent wireless terminal being set as child wireless terminals. Subsequently, a set of state determination data are collected from each of the child wireless terminals by the current temporary parent wireless terminal. The state determination data includes at least one of a wireless terminal state data of each of the child wireless terminals and a communication state data with each of the child wireless terminals. Then, it is determined whether the collecting operation is executed K cycles (K is a positive integer).

28 Claims, 14 Drawing Sheets

Fig. 4A

| WIRELESS TERMINAL IDENTIFER TABLE | 1 | ~301 |

Fig. 4B

| PARENT WIRELESS TERMINAL IDENTIFIER TABLE | 1 | ~302 |

Fig. 5

| IDENTIFIER (303) | TRANSMISSION RATE (BPS) (304) | REMAINING POWER QUANTITY (%) (305) | CONTINUATION FLAG (306) |
|---|---|---|---|
| 2 | 11240 | 50 | SET |
| 3 | 16850 | 98 | SET |
| 4 | 15021 | 85 | SET |

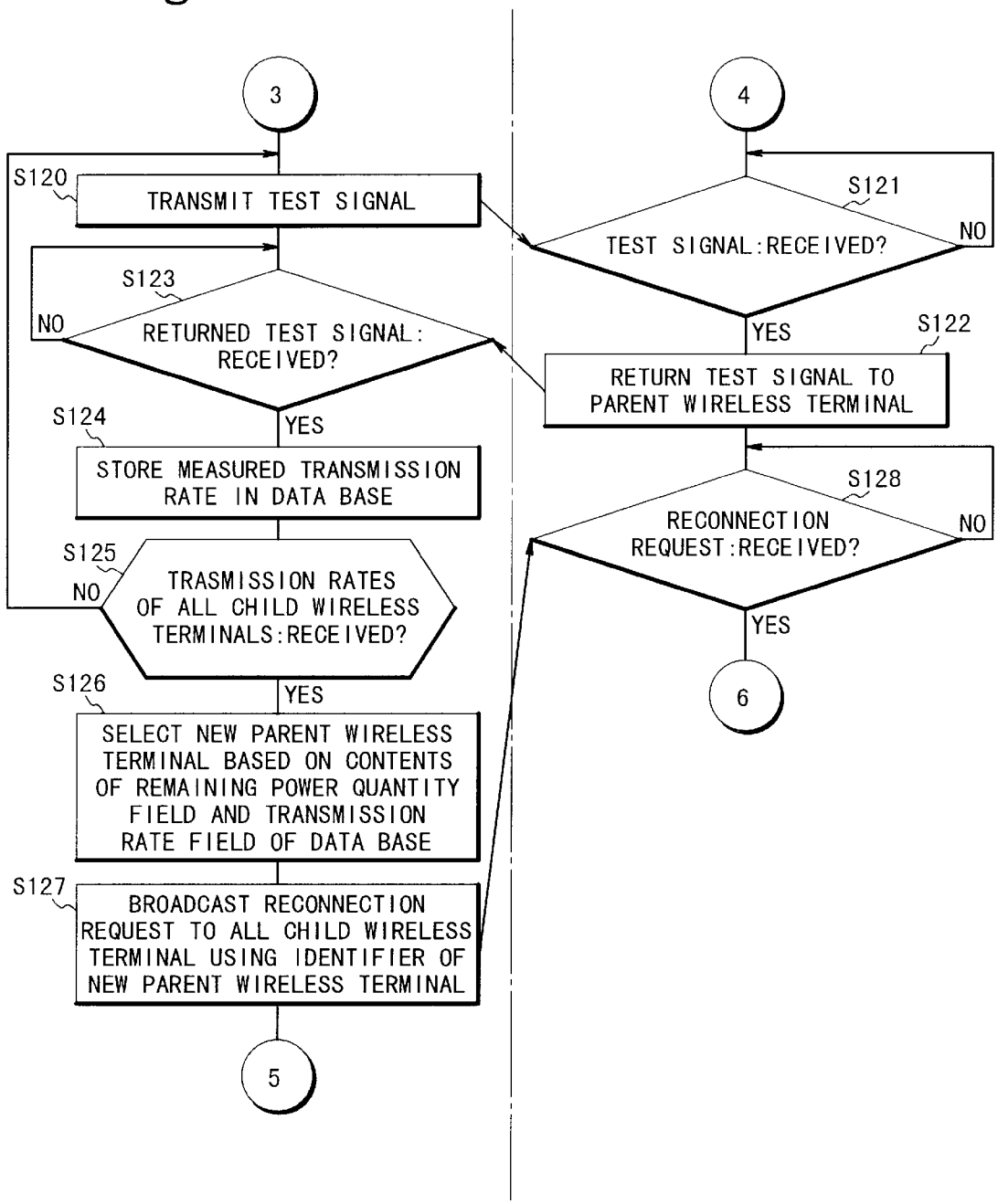

Fig. 11

| CHILD \ PARENT | (a) 100-4 | (b) 100-8 | (c) 100-6 | (d) MINIMUM |
|---|---|---|---|---|
| 100-1 | 60 (dB) | 54 (dB) | 53 (dB) | 53 (dB) |
| 100-2 | 78 (dB) | 50 (dB) | 35 (dB) | 35 (dB) |
| 100-3 | 77 (dB) | 33 (dB) | 50 (dB) | 33 (dB) |
| 100-4 | — | 16 (dB) | 20 (dB) | 16 (dB) |
| 100-5 | 50 (dB) | 14 (dB) | 72 (dB) | 14 (dB) |
| 100-6 | 20 (dB) | 24 (dB) | — | 20 (dB) |
| 100-7 | 76 (dB) | 66 (dB) | 7 (dB) | 7 (dB) |
| 100-8 | 16 (dB) | — | 24 (dB) | 16 (dB) |
| 100-9 | 45 (dB) | 61 (dB) | 9 (dB) | 9 (dB) |
| 100-10 | 25 (dB) | 75 (dB) | 60 (dB) | 25 (dB) |

METHOD FOR DETERMINING OPTIMAL PARENT TERMINAL AND AD HOC NETWORK SYSTEM FOR THE SAME

BACKGROUND OF THE INVENTION

1. Field of the Invention

The present invention relates to an ad hoc network system in which communication is performed between a predetermined number of terminals, and more particularly to a method for determining an optimal parent terminal and an ad hoc network system for the same.

2. Description of the Related Art

In a conventional ad hoc network, various methods are used to perform communication. One method is a parent wireless terminal intervening method in which an exclusive parent wireless terminal superior in processing capability to child wireless terminals is previously provided to form a network. Another method is a wireless terminal direct method in which synchronization is established each time data is transferred between wireless terminals which form the network. In the parent wireless terminal intervening method mentioned above, a wireless terminal located on an optimal communication position is selected as the parent wireless terminal. That is, the wireless terminal is selected as the parent wireless terminal such that all the child wireless terminals are contained in a communication region (service area) of the parent wireless terminal.

As a first conventional example of such a parent wireless terminal intervening communication system, a mobile wireless apparatus equipped with a function to support an optimal arrangement of a parent wireless terminal is disclosed in, for example, Japanese Laid Open Patent Disclosure (JP-A-Heisei 4-273638). In the first conventional example, a parent wireless terminal and each child wireless terminal are set to a test mode, and reception electric field strength between the parent wireless terminal and each child wireless terminal is measured in this test mode. The measurement result of this reception electric field strength is transmitted from each child wireless terminal to the parent wireless terminal. The parent wireless terminal can determine based on the measurement results that any child wireless terminal is impossible to use. Thus, the parent wireless terminal located on the optimal communication position is finally determined.

As a second conventional example of an ad hoc network system, a conference communication system is disclosed in Japanese Laid Open Patent Disclosure (JP-A-Heisei 4-367148). The conference communication system includes communication path allocating means for allocating a single wireless communication path to a plurality of child wireless terminals, and transmission status monitoring means for monitoring which of the child wireless terminals is transmitting on the single wireless communication line. Thereby, the child wireless terminals each having unexpensive and simple structures are allowed to perform conference communication.

Also, as a third conventional example, Japanese Laid Open Patent Disclosure (JP-A-Heisei 7-303280) is known. In the third conventional example, wireless terminals are subscribed to a network as a group, and communication limitation defining means is provided in a mobile wireless switch apparatus for group communication to define a simultaneous call limit for controlling traffic in the group. Thus, an ad hoc network is constructed.

In the first conventional example of the parent wireless terminal intervening communication system, because the measurement result of the reception electric field strength is transmitted from each child wireless terminal to the parent wireless terminal. As a result, any child wireless terminal which cannot be used is determined. However, this processing is complicated and takes a long time. Therefore, in the first conventional example, when the number of wireless terminals increases, there is the following problem. That is, the parent wireless terminal can not be selected for the plurality of child wireless terminal for a short time such that the parent wireless terminal is arranged on a communication position in a finally optimal service area.

Also, in the second conventional example of an ad hoc network, there is the following problem. That is, when the parent wireless terminal does not have a high data transmission rate, a transmission rate of the whole network is decreased due to a low transmission rate of a parent wireless terminal. Also, when the parent wireless terminal does not have an enough remaining battery power quantity, a communication line is disconnected because of power down in the parent wireless terminal.

SUMMARY OF THE INVENTION

The present invention is made in the above-mentioned circumstances. Therefore, an object of the present invention is to provide an ad hoc network system in which communication can be performed using an optimal parent wireless terminal and a method of configuring the same.

In order to achieve an aspect of the present invention, a method of configuring an ad hoc network system including a plurality of wireless terminals, includes the steps of:

(a) selecting at least one of a plurality of wireless terminals of a network as a current temporary parent wireless terminal, all of the plurality of wireless terminals other than the current temporary parent wireless terminal being set as child wireless terminals;

(b) collecting a set of state determination data from each of the child wireless terminals by the current temporary parent wireless terminal, the state determination data including at least one of a wireless terminal state data of each of the child wireless terminals and a communication state data with each of the child wireless terminals;

(c) determining whether the step (b) is executed K cycles (K is a positive integer);

(d) when it is determined in the step (c) that the step (b) is not yet executed K cycles, setting the current temporary parent wireless terminal as a previous temporary parent wireless terminal, and newly selecting at least one of the child wireless terminals as the current temporary parent wireless terminal based on the sets of state determination data for the child wireless terminals during the executed cycles of the step (b) such that the current temporary parent wireless terminal executes the step (b), the previous temporary parent wireless terminal and the child wireless terminals other than the current temporary parent wireless terminal being set as the child wireless terminals; and (e) when it is determined in the step (c) that the step (b) is executed K cycles, determining one of the child wireless terminals as a true parent wireless terminal by the current temporary parent wireless terminal based on the state determination data for the child wireless terminals for the K cycles.

In the step (a), at least one of the plurality of wireless terminals is designated as current temporary parent wireless terminal, and the plurality of wireless terminals other than the current temporary parent wireless terminal are set to the child wireless terminals. Then, an identifier of the current temporary parent wireless terminal is broadcasted to the child wireless terminals.

In the step (a), after the current temporary parent wireless terminal and the child wireless terminals are set, synchronization is established between the current temporary parent wireless terminal and each of the child wireless terminals. Also, after the synchronization is established, an identifier of each of the child wireless terminals is transmitted to the current temporary parent wireless terminal as a connection request.

In the step (b), the state determination data includes at least one of a remaining battery power quantity data as the wireless terminal state data and a transmission rate data, an error rate data and an electric field strength data as the communication state data to produce the state determination data. In this case, in the step (b), a state determination data notifying request may be broadcasted from the current temporary parent wireless terminal to the child wireless terminals, and a remaining battery power quantity may be detected in each of the child wireless terminals to produce a remaining battery power quantity data. Then, the remaining battery power quantity data as the wireless terminal state data is transmitted from each of the child wireless terminals to the current temporary parent wireless terminal, and the set of remaining battery power quantity data collected from the child wireless terminal is stored in a data base.

Also, in the step (b), a test data may be broadcasted to the child wireless terminals, and the test data may be returned from each of the child wireless terminals to the current temporary parent wireless terminal. At that time, a transmission rate of communication with each of the child wireless terminals is detected by the current temporary parent wireless terminal to produce a transmission rate data as the communication state data, and the set of transmission rate data collected from the child wireless terminals is stored in a data base.

Further, in the step (b), a test data may be broadcasted to the child wireless terminals, and the test data may be returned from each of the child wireless terminals to the current temporary parent wireless terminal. At that time, an error rate of communication with each of the child wireless terminals is detected to produce an error rate data as the communication state data, and the set of error rate data collected from the child wireless terminals is stored in a data base.

Otherwise, in the step (b), a test data may be broadcasted from each of the current temporary parent wireless terminals to the child wireless terminals, and electric field strength when the test data is received, may be detected in each of the child wireless terminals to produce an electric field strength data as the communication state data. At that time, the electric field strength data is transmitted from each of the child wireless terminals to the current temporary parent wireless terminal corresponding to the test data, and the set of electric field strength data collected from the child wireless terminals is stored in a data base.

In the last case, summing of electric field strength data for the executed cycles may be performed for each of the child wireless terminals, and at least one of the child wireless terminals as the current temporary parent wireless terminal is designated based on the summing results for the child wireless terminals. In this case, in the step (e), the data base is referred to to select a minimum value from among the state determination data obtained when the step (b) is executed K cycles, for each of the plurality of wireless terminals, and then one of the plurality of wireless terminals having a maximum value of the minimum values is designated as the true parent wireless terminal.

In the step (d), at least one of the child wireless terminals may be selected as the current temporary parent wireless terminal based on the sets of state determination data for the child wireless terminals for the executed cycles of the step (b), an identifier of the current temporary parent wireless terminal is broadcasted to the child wireless terminals. The transmitted identifier is compared with an own identifier in each of the child wireless terminals, and when the transmitted identifier and the own identifier are coincident with each other in each of the child wireless terminals, the child wireless terminal is set to the current temporary parent wireless terminal. Then, a data base is broadcasted to the child wireless terminals. The data base stores the state determination data for the child wireless terminals obtained when the step (b) has been already executed, as the sets of state determination data for the executed cycles of the step (b). The data base is stored therein by the current temporary parent wireless terminal.

When the state determination data is a remaining battery power quantity data and a transmission rate data, one of the plurality of wireless terminals having the highest transmission rate and the remaining battery power quantity data more than a predetermined value is designating as the true parent wireless terminal. In this case, at least one of the plurality of wireless terminals of the network is selected as the current temporary parent wireless terminal in response to a parent wireless terminal change request, and the parent wireless terminal change request is issued when the remaining battery power quantity becomes less than the predetermined value. Here, a sync signal is broadcasted to establish synchronization between the true parent wireless terminal and each of the other wireless terminal. Also, an identifier of each of the other wireless terminals is transmitted to the true parent wireless terminal, and a flag for the transmitted identifier is set in a data base.

In order to achieve another aspect of the present invention, an ad hoc network system includes a plurality of wireless terminals. Each of the plurality of wireless terminals includes a setting unit for setting the wireless terminal to a current temporary parent wireless terminal or a true parent wireless terminal when a parent terminal instruction is received, and to a child wireless terminals when a parent terminal instruction is not received, a data collecting unit for collecting a set of state determination data from each of the child wireless terminals when the wireless terminal is set to the current temporary parent wireless terminal, the state determination data including at least one of a wireless terminal state data of each of the child wireless terminals and a communication state data with each of the child wireless terminals, and a parent wireless terminal selecting unit for selecting at least one of the child wireless terminals as a current temporary parent wireless terminal based on already collected sets of state determination data for the child wireless terminals, and selecting one of the child wireless terminals as a true temporary parent wireless terminal based on already collected sets of state determination data for the child wireless terminals, when the collecting operation is repeated K cycles (K is a positive integer), and for broadcasting the parent terminal instruction to the child wireless terminals.

BRIEF DESCRIPTION OF THE DRAWINGS

FIGS. 4A and 4B are diagrams illustrating a wireless terminal identifier table and a parent wireless terminal identifier table to be both stored in the wireless terminal in the first embodiment of the present invention;

FIG. 5 is a diagram illustrating a data base to be stored in the wireless terminal in the first embodiment of the present invention;

FIGS. 6A to 6D are flow charts to explain the operation of the ad hoc network system according to the first embodiment of the present invention;

FIG. 11 is a diagram illustrating the contents of a data base of reception electric field strength data as the measurement result in the test mode in the ad hoc network system according to the second embodiment of the present invention.

DESCRIPTION OF THE PREFERRED EMBODIMENTS

The ad hoc network system of the present invention will be described below in detail with reference to the attached drawings.

Figure 1:
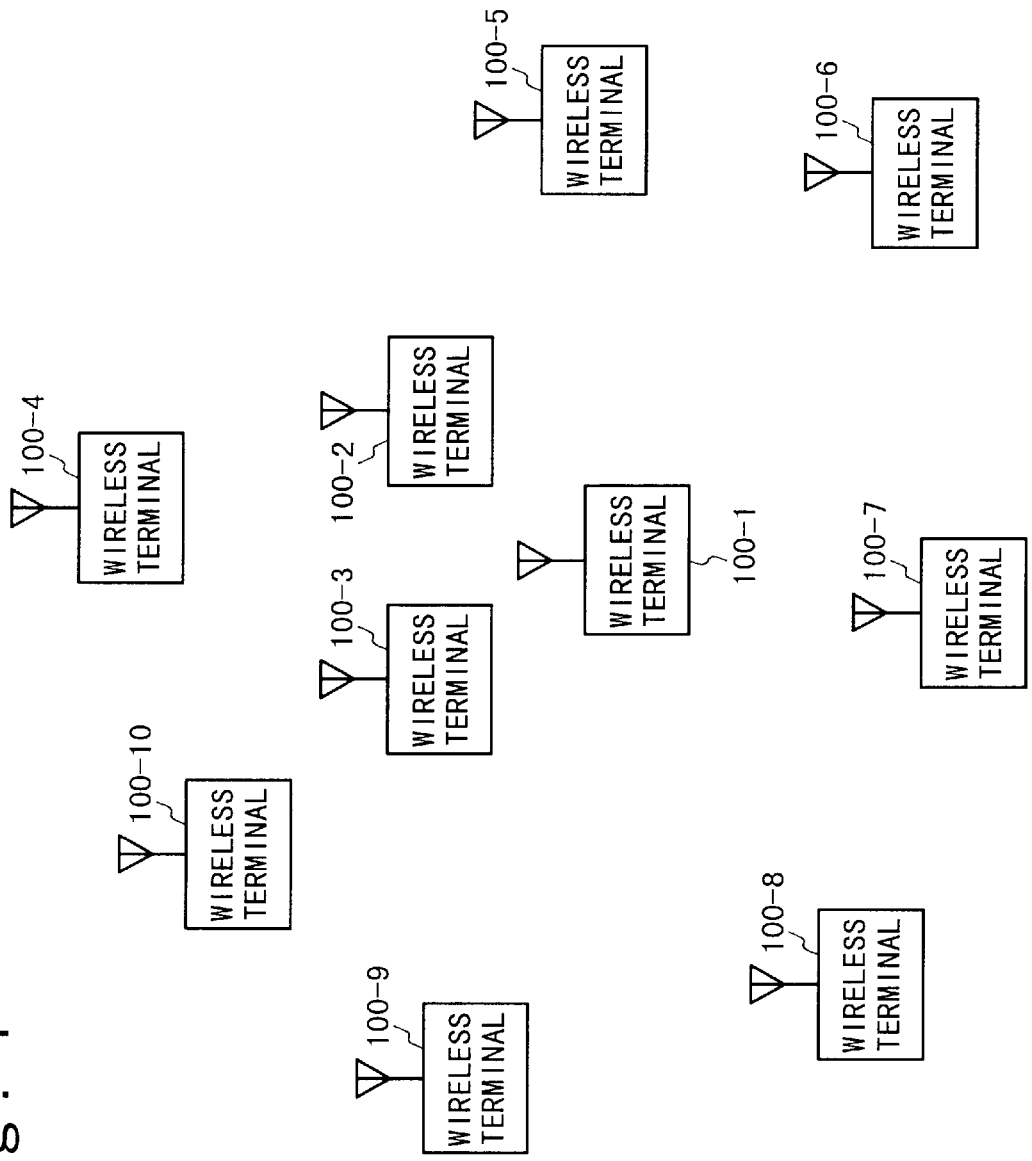
FIG. 1 is a block diagram illustrating a plurality of wireless terminals of an ad hoc network system to which the present invention is applied.

FIG. 1 shows an arrangement of wireless terminals 100 (100-1 to 100-10) of the ad hoc network system which are dispersedly provided. Each of wireless terminals 100-1 to 100-10 has the same structure.

Figure 2:
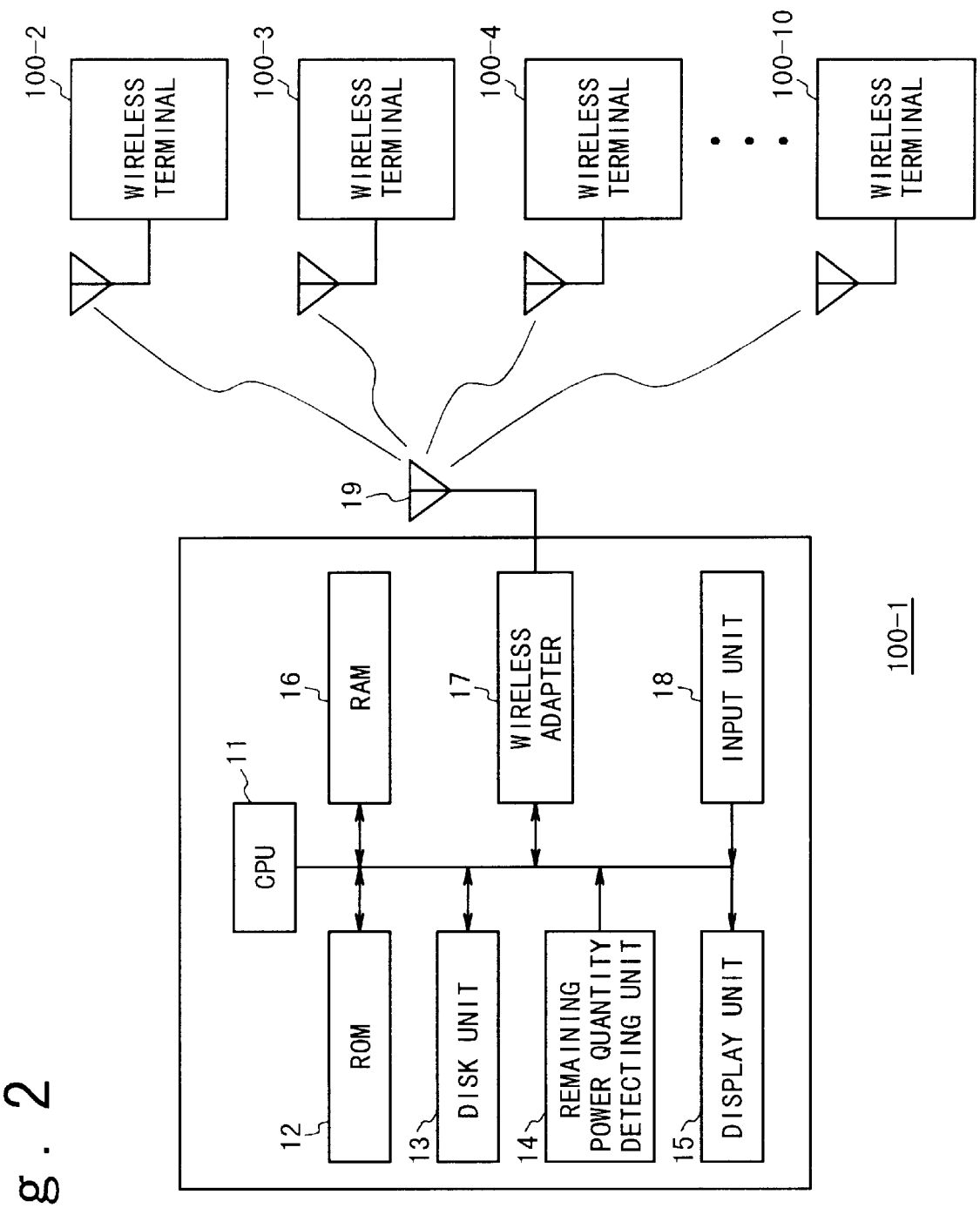
FIG. 2 is a system configuration diagram illustrating the structure of each wireless terminal of the ad hoc network system according to a first embodiment of the present invention.

FIG. 2 shows the structure of the wireless terminal 100-1 of the ad hoc network system according to the first embodiment of the present invention. Referring to FIG. 2, the wireless terminal 100-1 is composed of a CPU 11, a ROM 12, a disk unit 13, a remaining power quantity detecting unit 14, a display unit 15, a RAM 16, a wireless adapter 17, an input unit 18, and an antenna 19.

The CPU (central processing unit) 11 controls the whole apparatus. The RAM 16 stores a control program for selecting and designating a parent wireless terminal and a data base, and the ROM 12 stores a bootstrap program used in case of start of the apparatus. The disk unit 13 stores an operating system (OS) used for controlling the apparatus. The battery remaining power quantity detecting unit 14 always measures the remaining power quantity of a battery (not shown). The input unit 18 receives an input from a user, and the display unit 15 displays data to the user. The wireless adapter 17 controls wireless communication through the antenna 19. Also, as shown in FIGS. 4A and 4B, the RAM 16 of each wireless terminal includes a wireless terminal identifier table 301 for storing an identifier allocated to the wireless terminal, and a parent wireless terminal identifier table 302 for storing an identifier of the wireless terminal which is set as the current parent wireless terminal.

Also, in each of the wireless terminals 100-1 to 100-10, the control program is constructed on the RAM 206 in such a manner that the wireless terminal operates as the parent wireless terminal, when the identifier stored in the wireless terminal identifier table 301 and the identifier stored in the parent wireless terminal identifier table 302 are coincident, and the wireless terminal operates as the child wireless terminal, when they are different.

Figure 3:
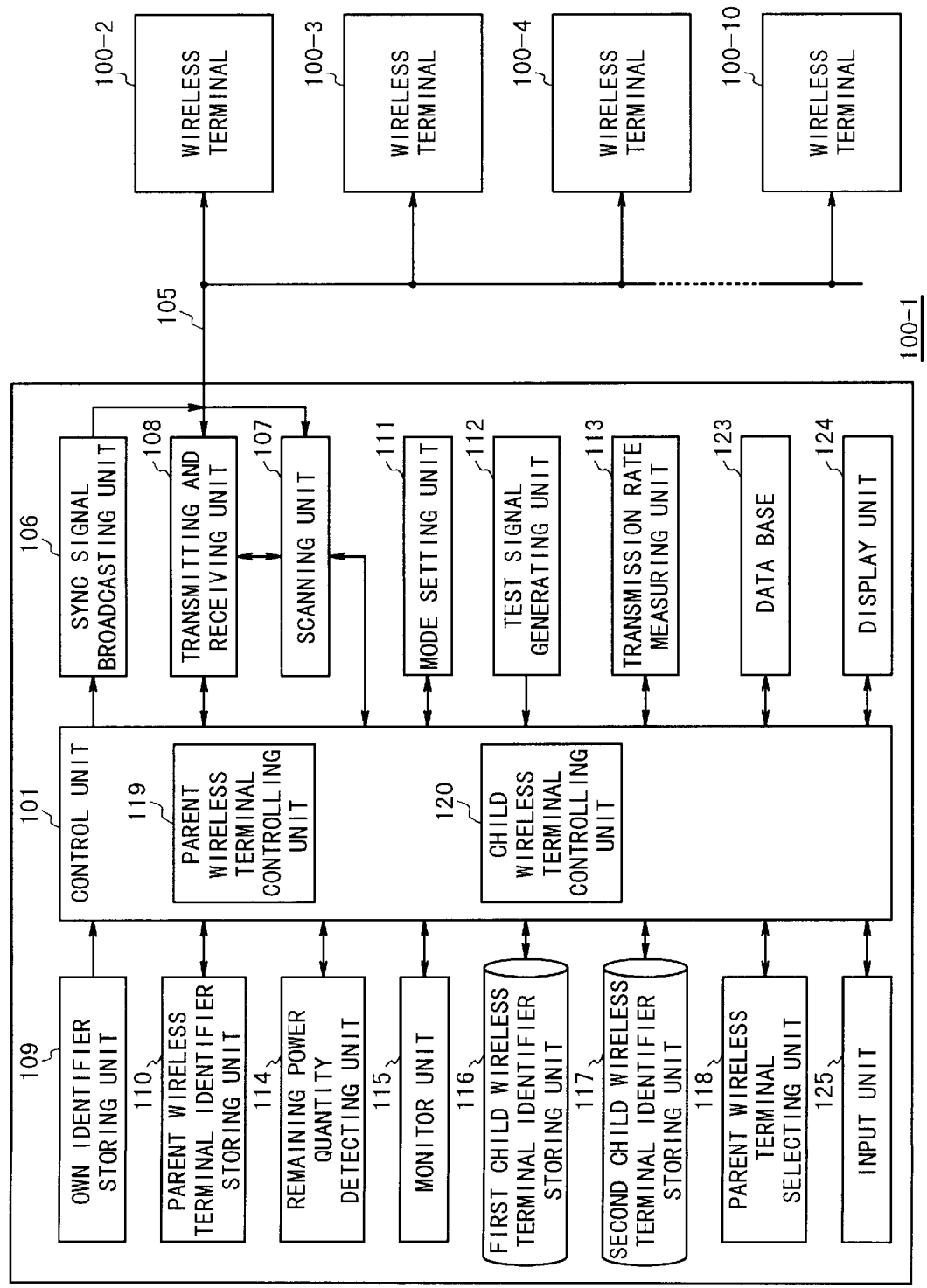
FIG. 3 is a functional block diagram illustrating the structure of each wireless terminal of the ad hoc network system according to the first embodiment of the present invention.
Figure 6A:
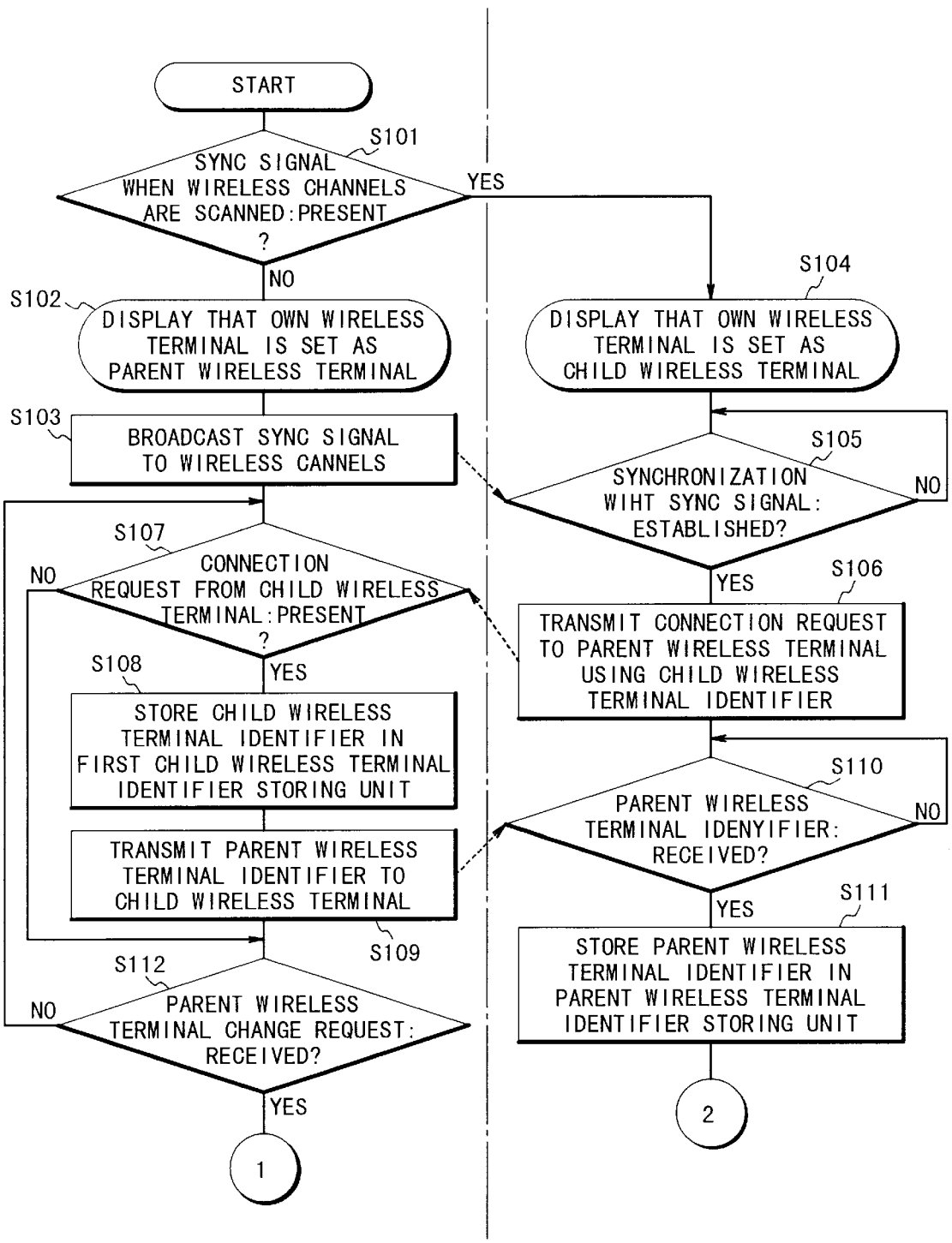
Figure 6B:
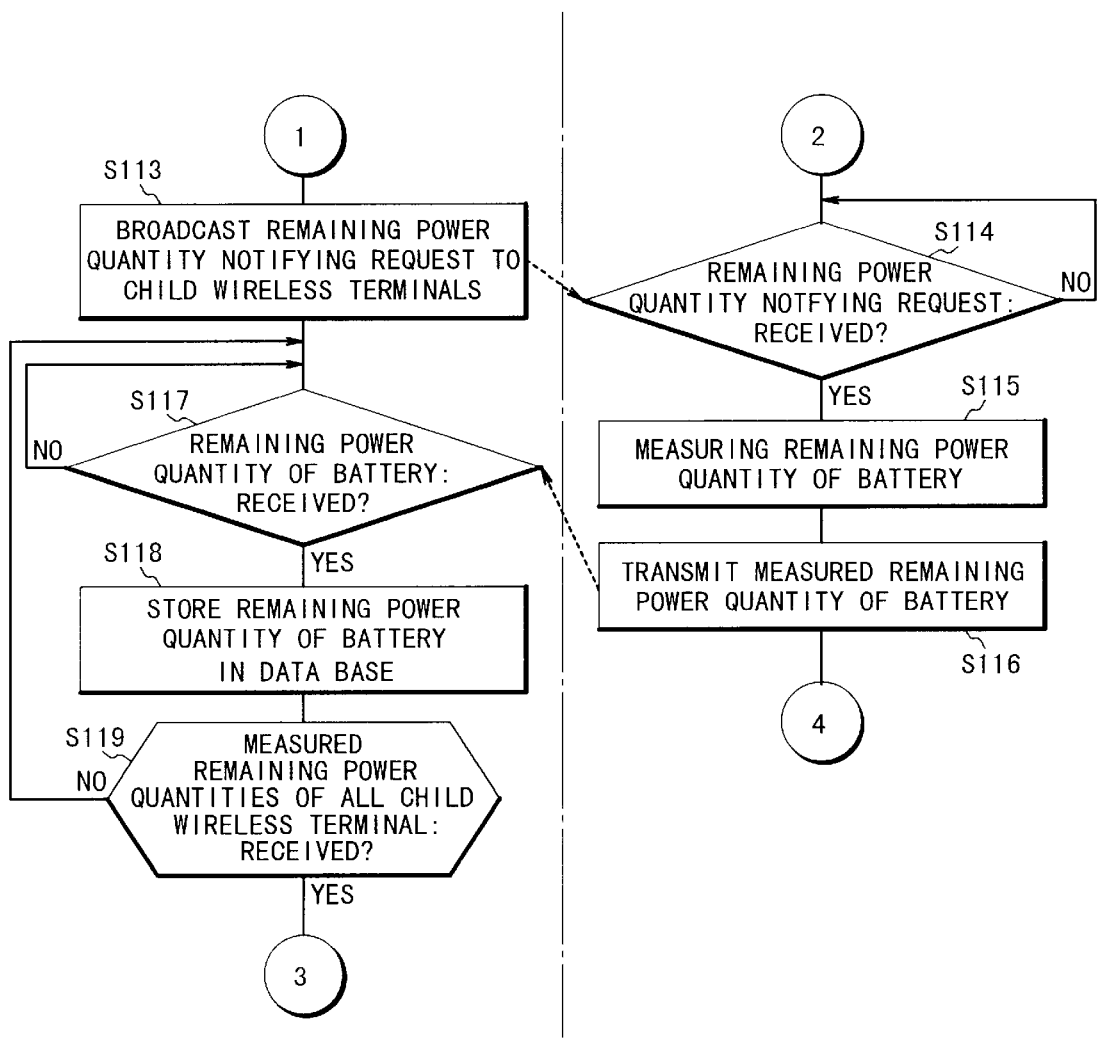
Figure 6D:
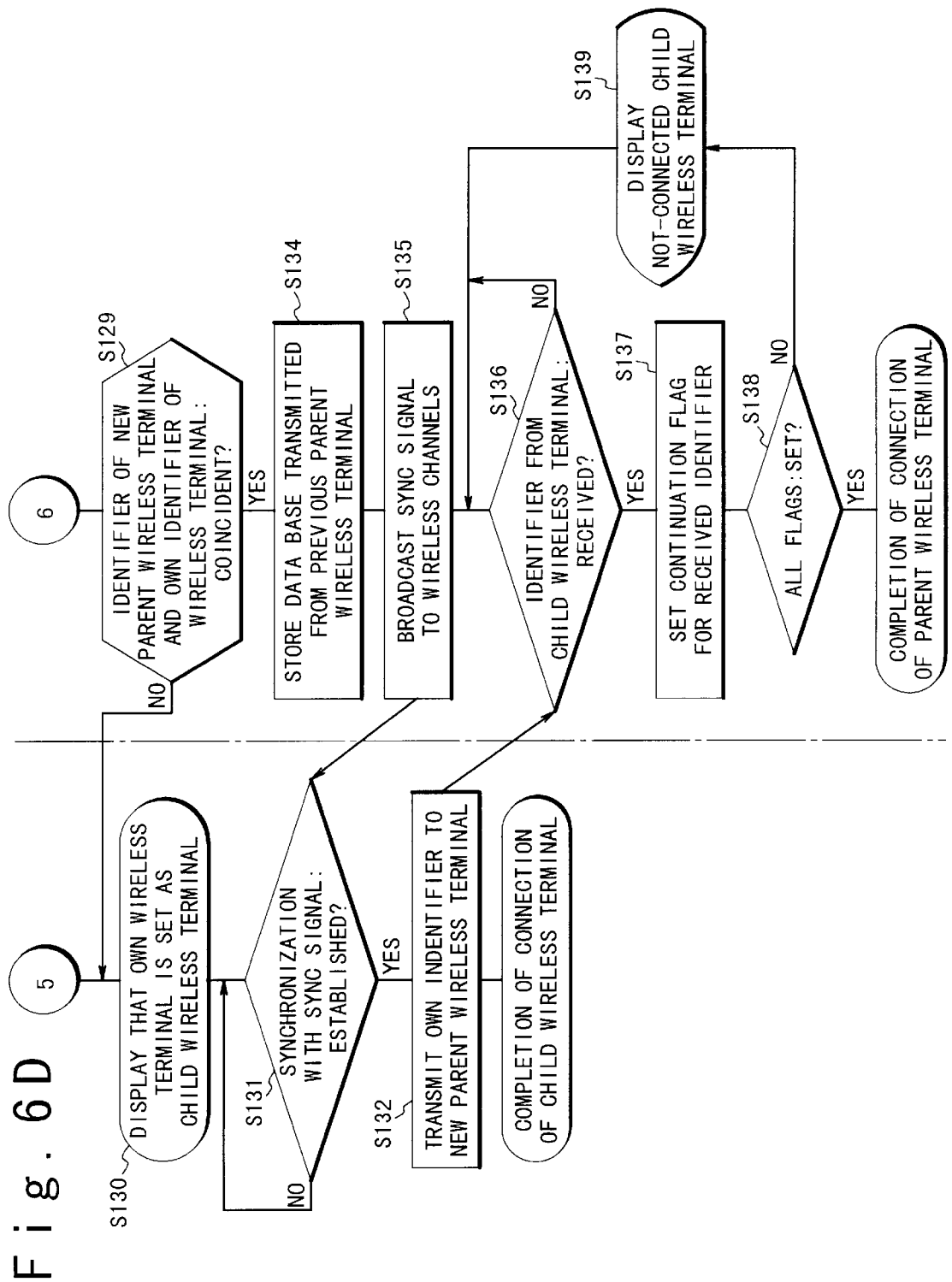

FIG. 3 shows the functional structure of the wireless terminal 100-1 of the ad hoc network system according to the first embodiment of the present invention. Referring to FIG. 3, the wireless terminal 100-1 is composed of a control unit 101 including a parent wireless terminal controlling unit and a child wireless terminal controlling unit 120, a sync signal broadcasting unit 106, a scanning unit 107, a transmitting and receiving unit 108, an own identifier storing unit 109, a parent wireless terminal identifier storing unit 110, a mode setting unit 111, a test signal generating unit 112, a transmission rate measuring unit 113, a remaining power quantity detecting unit 114, a monitor unit 115, a first child wireless terminal identifier storing unit 116, a second child wireless terminal identifier storing unit 117, a parent wireless terminal selecting unit 118, a data base 123, a display unit 124, and an input unit 125.

The following description is given, assuming that the wireless terminal 100-1 is temporarily set as the parent wireless terminal, and the wireless terminals 100-2 to 100-10 are set as the child wireless terminals.

The sync signal broadcasting unit 106 broadcasts a sync signal to establish synchronization with each of the other wireless terminals. The scanning unit 107 scans wireless channels to thereby find the sync signal from another wireless terminal. The transmitting and receiving unit 108 transmits and receives data using one wireless channel. The own identifier storing unit 109 stores a unique identifier allocated to each wireless terminal and the parent wireless terminal identifier storing unit 110 stores an identifier of a parent wireless terminal.

The mode setting unit 111 sets an operation mode of the wireless terminal 100-1 to determine the operation of the wireless terminal 100-1 in an initial connection stage using the scanning unit 107. A test mode is set for selecting a parent wireless terminal from among the wireless terminals 100-1 to 100-10. The test signal generating unit 112 generates a test data signal which is used to measure a transmission rate. The transmission rate measuring unit 113 measures a transmission rate between each of child wireless terminals 100-2 to 100-10 and the parent wireless terminal 100-1 in wireless communication using the test signal generated by the unit 112. The remaining power quantity detecting unit 114 detects a remaining power quantity of a battery (not shown) which has been installed in the own wireless terminal 100-1. The monitor unit 115 regularly drives the remaining power quantity detecting unit 114 to monitor the remaining power quantity of the battery.

The first child wireless terminal identifier storing unit 116 stores an identifier of each of current child wireless terminals when the wireless terminal 100-1 is set as the parent wireless terminal. The second child wireless terminal identifier storing unit 117 stores the identifiers of the child wireless terminals with which the wireless terminal 100-1 communicates before the parent wireless terminal is switched. The parent wireless terminal selecting unit 118 determines a new parent wireless terminal. The parent wireless terminal controlling unit 119 of the control unit 101 controls the wireless terminal 100-1 to operate as the parent wireless terminal when the wireless terminal 100-1 is selected as the parent wireless terminal. The child wireless terminal controlling unit 120 of the control unit 101 controls the wireless terminal 100-1 to operate as the child wireless terminal when the wireless terminal 100-1 is not selected as the parent wireless terminal.

As shown in FIG. 5, the data base is composed of an identifier field 303, a transmission rate field 304, a remaining power quantity field 305 and a continuation flag field 306. In the identifier filed, child wireless terminal identifiers are stored to identify child wireless terminals. In the transmission rate field, transmission rates between each of the child wireless terminals and the parent wireless terminal are stored. In the remaining power quantity field, the remaining battery power quantities of the child wireless terminals are stored. In the continuation flag field, continuation flags are stored to confirm whether or not communication is continuously performed when the parent wireless terminal is switched. Also, the continuation flags achieves a function equivalent to the second child wireless terminal identifier storing unit 117 of the wireless terminal 100-1. In this case, therefore, the second child wireless terminal identifier storing unit 117 may be realized as the contents of the continuation flag field 306 of the data base 123. Also, the first child wireless terminal identifier storing unit 116 may be realized as the contents of the identifier field 303 of the data base 123.

First, when the test mode is set by the mode setting unit 112 in response to a mode setting command inputted to the input unit 125 in the wireless terminal 100-1, the scanning unit 107 scans the wireless channels. When a sync signal is not received on the wireless channel 105 by the transmitting and receiving unit 108, the wireless terminal 100-1 is set as a parent wireless terminal by the control unit 101. Thus, the parent wireless terminal controlling unit 119 is activated to control the whole wireless terminal while the wireless terminal is set to the parent wireless terminal.

The identifier allocated to the wireless terminal 100-1 is read out from the own identifier storing unit 109 and is stored in the parent wireless terminal identifier storing unit 110. Then, the sync signal broadcasting unit 106 generates to broadcast onto the wireless channels 105. The wireless terminal 100-1 waits for the replies from the other wireless terminals 100-2 to 100-10.

Also, when the sync signal is received onto the wireless channel 105, each of the wireless terminals 100-2 to 100-10 recognizes that the wireless terminal is a child wireless terminal. In this case, the control unit 101 activates the child wireless terminal controlling unit 120 to control the whole wireless terminal while the wireless terminal is set to the child wireless terminal.

Then, the synchronization with the parent wireless terminal 100-1 is established using the sync signal in the scanning unit 107. When data exchange with the parent wireless terminal 100-1 by the transmission and reception unit 108 is made possible, the own identifier of each of the child wireless terminals 100-2 to 100-10 is read out from the own identifier storing unit 109 and then is sent to the parent wireless terminal 100-1. The parent wireless terminal 100-1 stores the identifier which is sent from each child wireless terminal in the first child wireless terminal identifier storing unit 116. The identifier of the parent wireless terminal is sent to each of the child wireless terminals 100-2 to 100-10 as the reply of transmission of the identifier. In the child wireless terminal which has received the identifier of the parent wireless terminal 100-1, the identifier of the parent wireless terminal is stored in the parent wireless terminal identifier storing unit 110.

The test signal generating unit 112 generates a test signal which is broadcasted to the child wireless terminals 100-2 to 100-10. When receiving the test signal, each of the child wireless terminals 100-2 to 100-10 returns the test signal to the parent wireless terminal 100-1. In the parent wireless terminal 100-1, the transmission rate measuring unit 113 detects a transmission rate between the parent wireless terminal 100-1 and each of the child wireless terminals 100-2 to 100-10. The measuring result is stored in the data base 123.

Also, each of the child wireless terminals 100-2 to 100-10 detects the remaining power quantity of the battery by the remaining power quantity detecting unit 114. The transmitting and receiving unit 108 transmits the detecting result to the parent wireless terminal 100-1 in response to a remaining power quantity notifying request. The remaining power quantity data is stored in the data base 123 in the parent wireless terminal 100-1.

The parent wireless terminal selecting unit 118 of the parent wireless terminal 100-1 selects a new true parent wireless terminal based on the contents of the data base 123, i.e., the sent remaining power quantity data and the detected transmission rate data of the child wireless terminals 100-2 to 100-10.

Next, the parent wireless terminal 100-1 reads out the identifiers of all the child wireless terminals from the first child wireless terminal identifier storing unit 116. Then, the parent wireless terminal 100-1 broadcasts the identifier of the new parent wireless terminal as a reconnection request of the network, and broadcasts the data base 123 to the child wireless terminals 100-2 to 100-10. Then, the wireless terminal 100-1 is set as the child wireless terminal.

Each of the wireless terminals 100-2 to 100-10 receives the reconnection request and stores the identifier of the new parent wireless terminal in the parent wireless terminal identifier storing unit 110. Each of the wireless terminals stores the identifier of the newly true parent wireless terminal in the parent wireless terminal identifier storing unit 110. Then, the content of the storing unit 110 and the content of the storing unit 109 are compared. When both are coincident with each other, the child wireless terminal is set as the parent wireless terminal. When the wireless terminal is set as the parent wireless terminal, the wireless terminal stores the received data base in the data base 123. In the other words, the identifiers of all the wireless terminals sent from the temporary parent wireless terminal 100-1 are stored in the second child wireless terminal identifier storing unit 117.

After that, the newly parent wireless terminal broadcasts the sync signal by the sync signal broadcasting unit 106. Also, each of the wireless terminals which have been set as the child wireless terminals notifies the identifier which is stored in the identifier storing unit 109 to the new true parent wireless terminal. The parent wireless terminal stores the sent identifier of the child wireless terminal in the first child wireless terminal identifier storing unit 116.

Then, after waiting for an enough time period required to be connected with each wireless terminal, the parent wireless terminal compares the identifiers which are stored in the first child wireless terminal identifier storing unit 116 and the identifiers which are stored in the second child wireless terminal identifier storing unit 117 to determine whether or not any wireless terminal which is not connected exist through switching of the parent wireless terminal.

Next, the operation of the ad hoc network system in the first embodiment will be described with reference to the flow charts shown in FIGS. 6A to 6D. In this case, the flow on the left side shows the operation as the temporary parent wireless terminal and the flow on the right side shows operation as the child wireless terminal.

First, a mode setting command is inputted from a user through the input unit 125 to the control unit 101. The mode setting unit 111 set a test mode in response to the mode setting command. The mode setting command may be supplied from another wireless terminal, e.g., the true parent wireless terminal for switching a true parent wireless terminal while conference communication is performed. In each of the wireless terminals 100-1 to 100-10, the wireless channels are scanned by the scanning unit 107 to check whether or not a sync signal is already broadcasted onto the wireless channel (Step 101). When the sync signal is not received, the identifier of the wireless terminal identifier table 301 in the own identifier storing unit 109 is stored in the parent wireless terminal identifier table 302 in the parent wireless terminal identifier storing unit 110. As a result, the wireless terminal 100-1 is set as a temporary parent wireless terminal. Then, it is displayed on the display unit 124 to inform to the user (Step 102). Also, when the sync signal is received, it is displayed to the user using the display unit 124 that the wireless terminal is set as the child wireless terminal (Step 104).

Thereafter, the sync signal is broadcasted to the child wireless terminals 100-2 to 100-10 on the wireless channels (Step 103). The synchronization with the temporary parent wireless terminal using the sync signal broadcasted from the temporary parent wireless terminal is established to allow data transfer between the temporary parent wireless terminal 100-1 and each of the wireless terminals 100-2 to 100-10 (Step 105).

Next, each of the child wireless terminals 100-2 to 100-10 transmits a connection request with the temporary parent wireless terminal to the parent wireless terminal 100-1 using the identifier which is stored in the wireless terminal identifier table 301 (Step 106). When receiving the connection request from each of the child wireless terminals 100-2 to 100-10 (Step 107), the parent wireless terminal 100-1 stores the identifier of each of the child wireless terminals 100-2 to 100-10 in the identifier field 303 of the data base 123 (FIG. 5) and the first child wireless terminal identifier storing unit 116 (Step 108). Then, the parent wireless terminal 100-1 notifies the identifier of the temporary parent wireless terminal to each of the child wireless terminals 100-2 to 100-10 (Step 109). When receiving the identifier of the temporary parent wireless terminal (Step 110), each of the child wireless terminals 100-2 to 100-10 stores the notified identifier of the temporary parent wireless terminal in the parent wireless terminal identifier table 302 of the parent wireless terminal identifier storing unit 110 (Step 111). The temporary parent wireless terminal 100-1 waits for the connection requests from the respective child wireless terminals for a predetermined time period.

Thereafter, when a parent wireless terminal change request is automatically or manually inputted (Step 112), the temporary parent wireless terminal 100-1 broadcasts a remaining power quantity acquisition request to all the child wireless terminals 100-2 to 100-10 to acquire the remaining power quantity data of the battery of each of the child wireless terminals 100-2 to 100-10 (Step 113). In this example, a state determination data is composed of a remaining power quantity data as a wireless terminal state data and a transmission rate data as a communication state data. Only one of them may be used as the state determination data. Also, instead of the transmission rate data, an error rate data may be used, to be described later.

When receiving the remaining power quantity acquisition request (Step 114), the battery remaining power quantity detecting unit 1141 detects the remaining power quantity of the battery each child wireless terminal (Step 115) and notifies to the temporary parent wireless terminal 100-1 (Step 116). When receiving the remaining power quantity data of the battery (Step 117), the temporary parent wireless terminal 100-1 stores in the battery remaining power quantity field 305 of the data base 123 corresponding to the child wireless terminal (Step 118).

When receiving the battery remaining power quantity data from all child wireless terminals 100-2 to 100-10 (Step 119), the temporary parent wireless terminal 100-1 generates a test signal by the test signal generating unit 112 to broadcast to the child wireless terminals 100-2 to 100-10 by the transmitting and receiving unit 108 (Step 120). When receiving the test signal (Step 121), each of the child wireless terminals 100-2 to 100-10 sends back the test signal to the temporary parent wireless terminal 100-1 just as it is (Step 122). The temporal parent wireless terminal 100-1 receives the sent test signal from each of the child wireless terminals 100-2 to 100-10 (Step 123), and measures a transmission rate between the child wireless terminal and the temporary parent wireless terminal 100-1. The temporary parent wireless terminal 100-1 stores the measured transmission rate (for example, a transmission rate in unit of bps when the test signal of 100 kbits is used) in the transmission rate field 304 of the data base 123 corresponding to the child wireless terminal (Step 124). The above operation is repeated for all the child wireless terminals 100-2 to 100-10 (Step 120 to 125).

When the transmission rates are measured for all the child wireless terminals, the next parent wireless terminal is selected to have the highest transmission rate from among the child wireless terminals and having the battery remaining power quantity more than a predetermined value of, for example, 70%. In this example, the wireless terminal 100-3 is selected as a new true parent wireless terminal by the parent wireless terminal selecting unit 118 with reference to the data base (FIG. 5) (Step 126). The temporary parent wireless terminal 100-1 broadcasts the identifier of the new true parent wireless terminal 100-3 as a reconnection request and the data base 123 in which data of the continuation flag field 305 are cleared (FIG. 3) as a parent wireless terminal switching request to all the child wireless terminals 100-2, 100-4 to 100-10 (Step 127). At this time, the identifier of the new true parent wireless terminal 100-3 is stored in the parent wireless terminal identifier storing unit 110 in the temporary parent wireless terminal 100-1. When receiving the parent wireless terminal switching request (Step 128), each of the child wireless terminals 100-2, 100-4 to 100-10 stores the identifier of the notified new parent wireless terminal in the parent wireless terminal identifier table 302 of the parent wireless terminal identifier storing unit 110.

Then, the identifier of the new parent wireless terminal is compared with the identifier of the own wireless terminal which is stored in the wireless terminal identifier table 301 of the own identifier storing unit 109 in the wireless terminal 100-1 to 100-10 (Step 129). When the compared result does not indicate coincidence, it is noticed to the user by the display unit 124 in each of the wireless terminals 100-1, 100-2, 100-4 to 100-10 that the wireless terminal is set as the child wireless terminal (Step 130). The synchronization with new true parent wireless terminal 100-3 is established using the sync signal from the new true parent wireless terminal (Step 131), and the own wireless terminal identifier is noticed from the own identifier storing unit 109 to the true parent wireless terminal 100-3 (Step 132). Thus, the reconnection is ended.

When the compared result indicates coincidence, the child wireless terminal 100-3 shows to the user by the display unit 124 that the wireless terminal 100-3 is set as the parent wireless terminal (Step 133), and stores the data base (FIG. 5) which has been sent from the temporary parent wireless terminal 100-1 in the data base 123 (FIG. 5) (Step 134). Then, the true parent wireless terminal 100-3 broadcasts a sync signal onto the wireless channels (Step 135). Every time the identifier of each of the child wireless terminals 100-1, 100-2, 100-4 to 100-10 as a connection request is received (Step 136), the new true parent wireless terminal 100-3 stores the identifier in the first child wireless terminal identifier storing unit 116 and sets the continuation flag in the field 306 of the data base 123 for the received identifier (Step 137). If all the continuation flags are set (Step 138), any child wireless terminal which is not connected is noticed to the user by the display unit 124 (Step 139). The true parent wireless terminal 100-3 continues to wait for the connection requests from all the child wireless terminals 100-1, 100-2, 100-4 to 100-10 (Steps 136 to 139).

In this manner, the reconnection completes when all continuation flags are set up, and the reconfiguration of the network is complete.

It should be noted that when any wireless terminal which cannot continue communication has been left in the switching of the parent wireless terminal, the switching of the parent wireless terminal may be determined to be failed. In this case, the network may be reconfigured using the previous parent wireless terminal. Instead, when the reception situation is wrong to prevent the connection, the wireless terminal may be moved to the place of good reception situation to establish the connection.

Also, in the first embodiment, the temporary parent wireless terminal is designated and then the true parent wireless terminal is determined. However, the temporary parent wireless terminal may designate a next temporary parent wireless terminal. After this operation is repeated plural times, the true parent wireless terminal may be determined.

When the remaining power quantity is decreased less than the predetermined value while the conference communication is performed, the true parent wireless terminal may issues a parent terminal change request to switch the parent wireless terminal. Thus, the decrease of system performance can be prevented.

Next, an ad hoc communication network system according to the second embodiment of the present invention will be described in detail.

Figure 7:
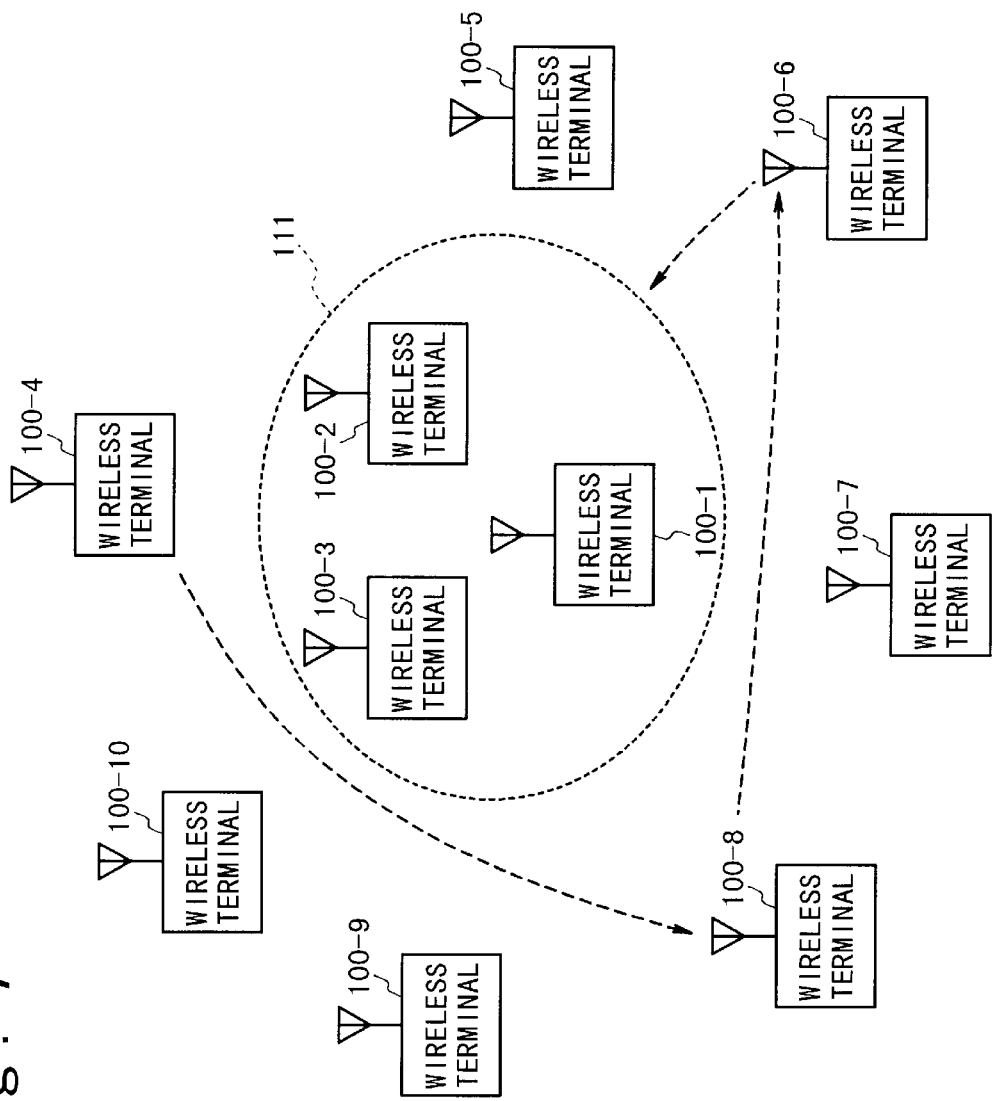
FIG. 7 is a block diagram which shows the whole structure of an ad hoc communication network system according to a second embodiment of the present invention.

FIG. 7 is an arrangement diagram of the wireless terminals 100-1 to 100-10 of the ad hoc network system. The wireless terminals 100-1 to 100-10 have the same configuration and structure. Each of the wireless terminals 100-1 to 100-10 can operate as a parent wireless terminal or a child wireless terminal. In the example described below, the wireless terminals 100-1, 100-2, 100-3 which are selected as the final candidates of the parent wireless terminals exist in an area 111.

Figure 8:
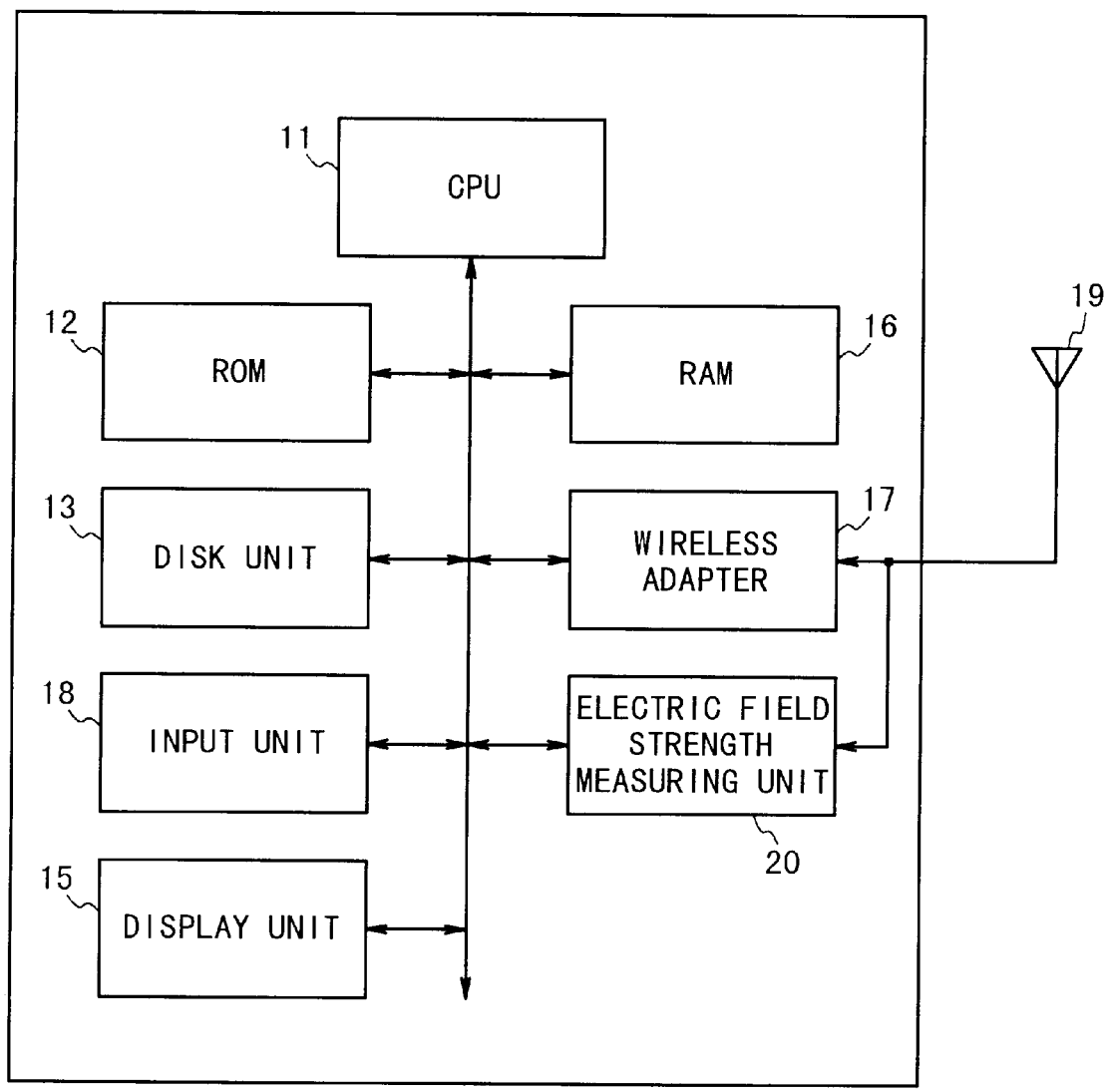
FIG. 8 is a system configuration diagram illustrating the structure of each wireless terminal of the ad hoc network system according to the second embodiment of the present invention.

FIG. 8 is a block diagram which shows the whole structure of the ad hoc network system according to the second embodiment of the present invention. Referring to FIG. 8, the wireless terminal 100 is composed of a CPU 11, a ROM 12, a disk unit 13, a display unit 15, a RAM 16, a wireless adapter 17, an input unit 18, an antenna 19, and an electric field strength measuring unit 20.

The CPU (central processing unit) 11 controls the whole apparatus. The RAM 16 stores a program for control and a data base used for control, and the ROM 12 stores bootstrap program used in case of start of the apparatus. The disk unit 13 stores an operating system (OS) for controlling the apparatus. The input unit 18 receives an input from a user, and the display unit 15 outputs data to the user. The wireless adapter 18 controls wireless communication through the antenna 19. Also, the RAM 16 of each wireless terminal includes a wireless terminal identifier table 301 for storing an identifier allocated to the wireless terminal, and a parent wireless terminal identifier table 302 for storing an identifier of the wireless terminal which is set as the current parent wireless terminal, as shown in FIGS. 4A and 4B. The electric field strength measuring unit 20 measures electric field strength when a test signal is received in a case that the wireless terminal is set as the child wireless terminal.

Also, in each of the wireless terminals 100-1 to 100-10, the program is constructed on the RAM 206 in such a manner that the wireless terminal operates as the parent wireless terminal, when the identifier stored in the wireless terminal identifier table 301 and the identifier stored in the parent wireless terminal identifier table 302 are equal, and the wireless terminal operates as the child wireless terminal, when they are different.

Figure 9:
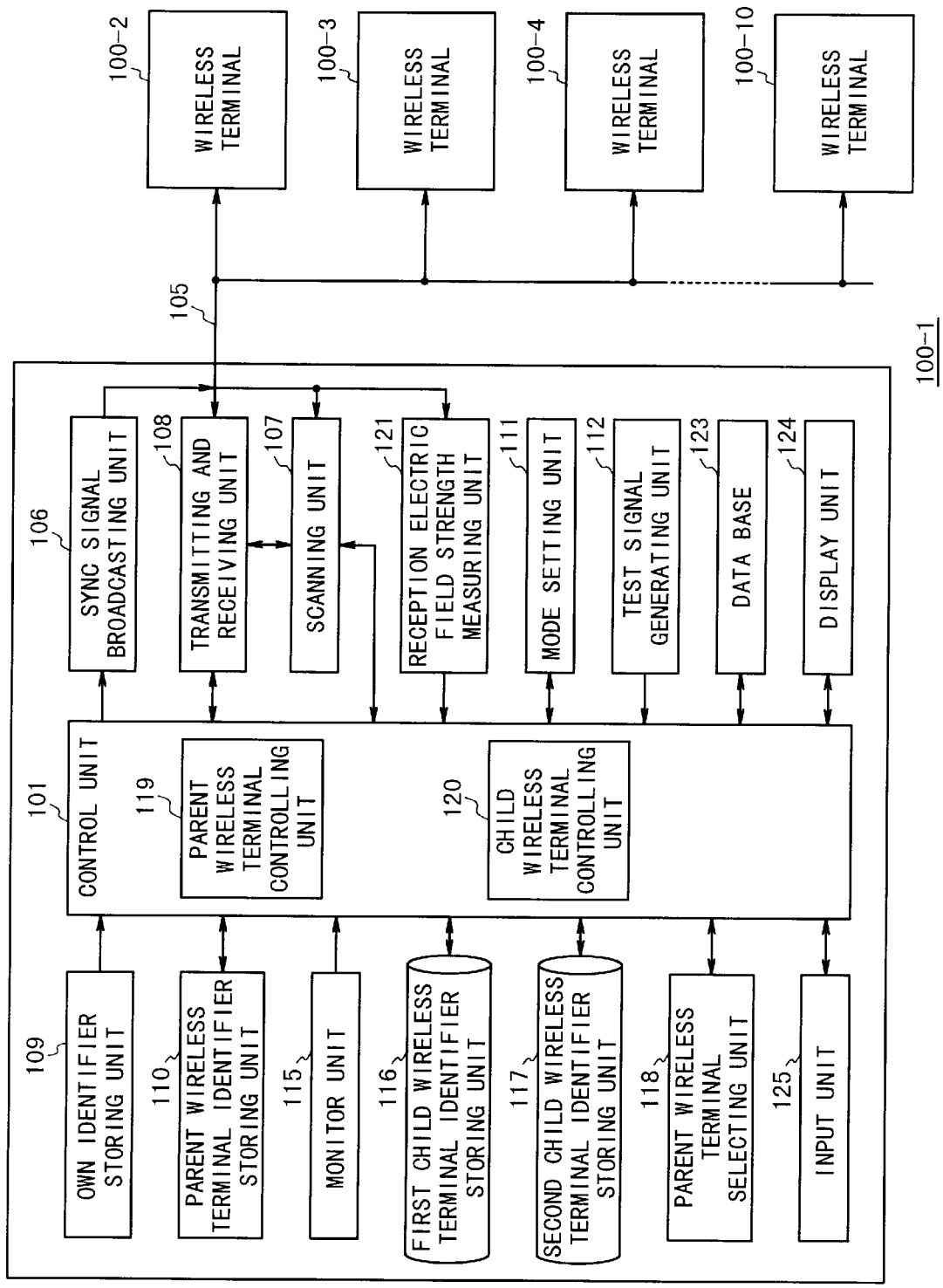
FIG. 9 is a functional block diagram illustrating the structure of each wireless terminal of the ad hoc network system according to the second embodiment of the present invention.

FIG. 9 shows a functional block diagram illustrating the structure of each of the wireless terminals 100-1 to 100-10. In this case, the same components as in FIG. 3 are allocated with the same reference numerals as in the first embodiment, respectively. The description of these components will be omitted.

Referring to FIG. 9, the wireless terminal 100 is composed of a control unit 101 including a parent wireless terminal controlling unit and a child wireless terminal controlling unit 120, a sync signal broadcasting unit 106, a scanning unit 107, a transmitting and receiving unit 108, an own identifier storing unit 109, a parent wireless terminal identifier storing unit 110, a mode setting unit 111, a test signal generating unit 112, a monitor unit 115, a first child wireless terminal identifier storing unit 116, a second child wireless terminal identifier storing unit 117, a parent wireless terminal selecting unit 118, a reception electric field strength measuring unit 121, a data base 123, a display unit 124, and an input unit 125.

The following explanation is given, assuming that the wireless terminal 100-4 is set as the temporary parent wireless terminal, and the wireless terminals 100-1 to 100-3, and 100-5 to 100-10 are set as the child wireless terminals.

The test signal generating unit 112 generates a test signal which is used to measure the electric field strength, when the wireless terminal 100-4 is selected as a temporary parent wireless terminal. The reception electric field strength measuring unit 121 measures electric field strength when the test signal is received from the temporary parent wireless terminal 100-4.

FIG. 11 is a diagram illustrating the data base 123 which stores reception electric field strength data in the test mode. Referring to FIG. 11, the data base is provided in the RAM 16 of FIG. 8. The data base stores reception electric field strength data of all the wireless terminals 100-1 to 100-10 in the test mode in which the wireless terminal located on the optimal communication position is selected as the parent wireless terminal for a short time. The data base is composed of an identifier field, a reception electric field strength data field and a continuation flag field for every wireless terminal (not shown in FIG. 11). In the identifier field, child wireless terminal identifiers are stored to identify child wireless terminals. In the reception electric field strength field, the electric field strength data of the child wireless terminals are stored. In the continuation flag field, continuation flags are stored to determine whether or not communication is continuously performed when the parent wireless terminal is switched. Also, the continuation flags achieves a function equivalent to the second child wireless terminal identifier storing unit 117.

Figure 10A:
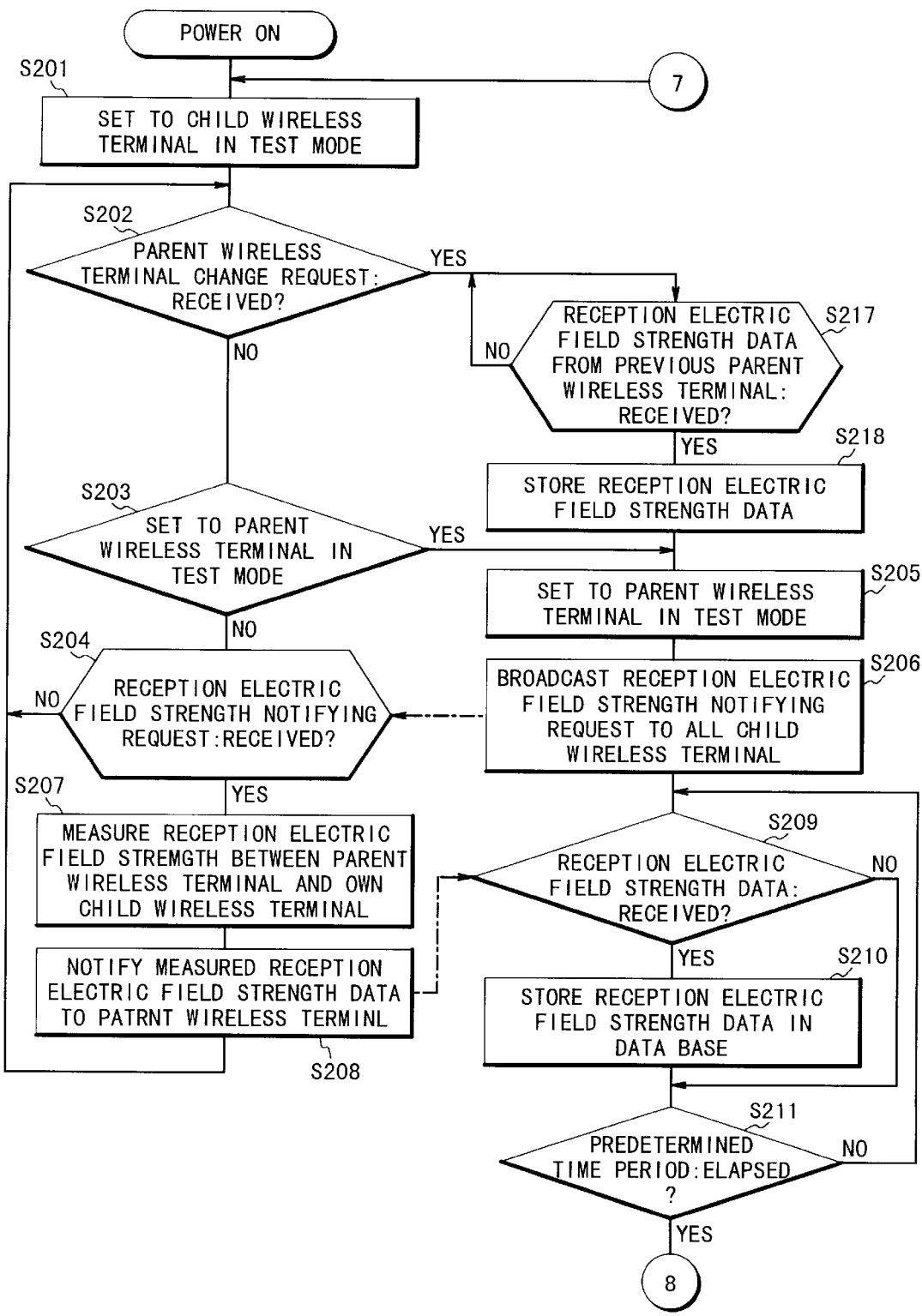
FIGS. 10A and 10B are flow charts to explain the operation of the ad hoc network system according to the second embodiment of the present invention.
Figure 10B:
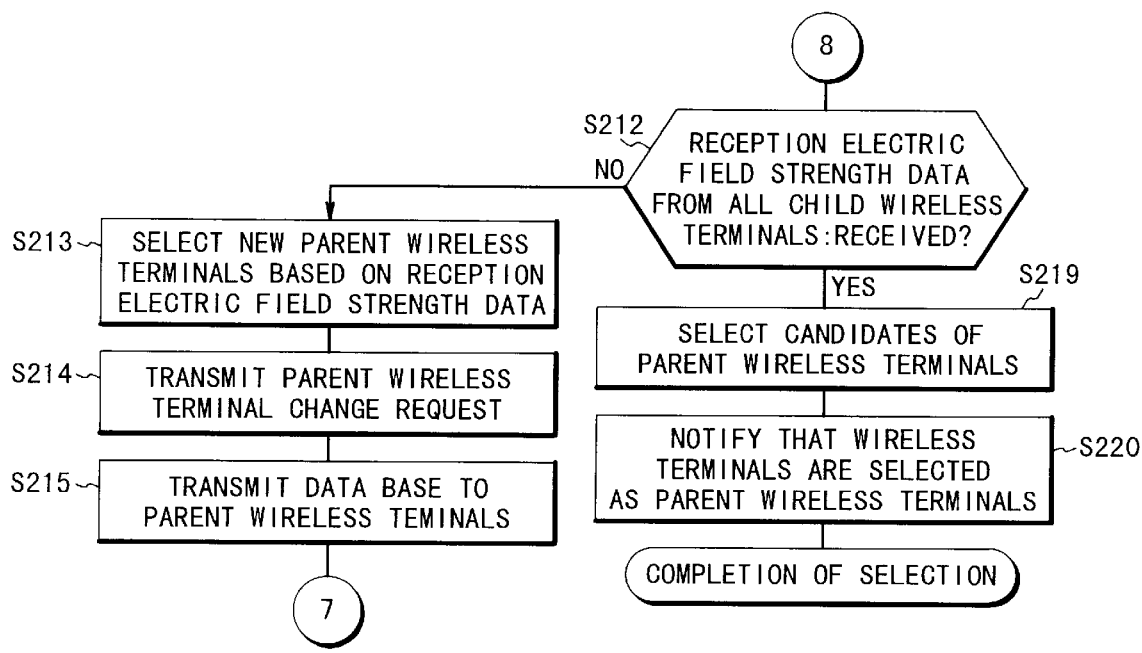

Next, the operation of the ad hoc network system in the second embodiment will be described. FIGS. 10A and 10B are flow charts to explain the operation of the ad hoc network system.

Referring to FIG. 10A, when the wireless terminals 100-1 to 100-10 start the operation, the test mode is set by the test mode setting unit 111 of each of the wireless terminals 100-1 to 100-10. As a result, all the wireless terminals 100-1 to 100-10 are set to the child wireless terminals. The parent wireless terminal controlling unit 119 of the control unit 101 controls the own wireless terminal 100-4 to operate as the parent wireless terminal in the test mode, i.e., a first temporary parent wireless terminal. That is, the own identifier is read out from the own identifier storing unit 109 and stored in the parent wireless terminal identifier storing unit 110. Also, the child wireless terminal controlling unit 120 controls the wireless terminal to operate as the child wireless terminal in the test mode. The sync signal boardcasting unit 106 to broadcast the sync signal to the other wireless terminal 100-1 to 100-3 and 100-5 to 100-10.

The test mode setting unit 111 of each of the other wireless terminals 100-1 to 100-3 and 100-5 to 100-10 receives the sync signal by the transmitting and receiving unit 108 to recognize that the wireless terminal is set as the child wireless terminal.

For example, the wireless terminal 100-4 is indicated as the parent wireless terminal 100-4. Also, the wireless terminals 100-1 to 100-10 transmit and receive the identifiers which are stored in the own identifier storing units 109 through the wireless communication, respectively, to distinguish each of the wireless terminal 100-1 to 100-10 in case of the following operation. Further, the parent wireless terminal identifier storing unit 110 stores the data to distinguish one of the wireless terminals 100-1 to 100-10 which is set as the current parent wireless terminal, and the following processing is performed.

Next, in the first parent wireless terminal 100-4, the parent wireless terminal controlling unit 210 controls the transmitting and receiving unit 108 and performs wireless transmission to the child wireless terminals 100-1 to 100-3 and 100-5 to 100-10 through the antenna 19. When the child wireless terminals 100-1 to 100-3 and 100-5 to 100-10 receive this wireless transmission through the antenna 19 and the wireless transmitting and receiving unit 108. Reception electric field strength measuring unit 121 measures electric field strength at the time of this reception. The reception electric field strength data which are measured by this child wireless terminal 100-1 to 100-3 and 100-5 to 100-10 are wireless-transmitted to the first parent wireless terminal 100-4 and are notified, respectively.

The first parent wireless terminal 100-4 receives the reception electric field strength data notified by the wireless transmission from each of the child wireless terminals 100-1 to 100-3 and 100-5 to 100-10 via the antenna 19 by the wireless transmitting and receiving unit 108. The first parent wireless terminal 100-4 stores the measuring results in the data base shown in FIG. 11 as a reception electric field strength data sequence (a). After this, in the first parent wireless terminal 100-4, the parent wireless terminal selecting unit 118 selects the child wireless terminals 100-8 as a second temporary parent wireless terminal which has the reception electric field strength of 16 dB which is the smallest among the reception electric field strength data sequence (a). The wireless terminal 100-8 can be considered as the one which is located on the farthest position from the first parent wireless terminal 100-4.

The first parent wireless terminal 100-4 transmits the reception electric field strength data sequence (a) of the data base and a control signal to the second parent wireless terminal 100-8 through the transmitting and receiving unit 108 and the antenna 19 by the wireless communication. The second parent wireless terminal 100-8 receives the reception electric field strength data sequence (a) of the data base and the control signal from first parent wireless terminal 100-4 through the antenna 19 and the transmitting and receiving unit 108. The reception electric field strength data sequence (a) is stored in the data base 123 of the second parent wireless terminal 100-8.

Also, the parent wireless terminal controlling unit 119 controls the wireless terminal 100-8 as the parent wireless terminal. That is, the previous child wireless terminal 100-8 is set to operate as the second parent wireless terminal 100-8. The second parent wireless terminal 100-8 operates in the same manner as the parent wireless terminal 100-4, and collects the reception electric field strength data from the child wireless terminals 100-1 to 100-7, 100-9 and 100-10. The reception electric field strength data collected by the second parent wireless terminal 100-8 is stored in the data base as the reception electric field strength data sequence (b), as shown in FIG. 11.

Next, the second parent wireless terminal 100-8 selects the wireless terminal 100-6 as the third temporary parent wireless terminal by the parent wireless terminal selecting unit 207. The wireless terminal 100-6 has the minimum of the addition values (20 dB+24 dB) of the reception electric field strength data sequence (a) which transmitted from the first parent wireless terminal 100-4 and the reception electric field strength data sequence (b) which is collected by the own wireless terminal 100-8 for every child wireless terminal 100-1 to 100-7, 100-9 and 100-10. Thus, the wireless terminal 100-6 is regarded to exist in the position which is apart from the first and second parent wireless terminals 100-4 and 100-8.

After this, the second parent wireless terminal 100-8 transmits a control signal as well as the reception electric field strength data sequence (b) of the data base to the child wireless terminal 100-6. The child wireless terminal 100-6 operates in the same manner as the second parent wireless terminal 100-8 and is set to operate as the third temporary parent wireless terminal 100-6. The third parent wireless terminal 100-6 collects the reception electric field strength data sequence (c) of the data base 123, as shown in FIG. 11.

In this way, in a plurality of wireless terminals M (M≧2), e.g., the first to third parent wireless terminals 100-4, 100-8 and 100-6 in this example, the reception electric field strength data sequences (a), (b) and (c) of the data base 123 are collected. The reception electric field strength data sequences (a), (b) and (c) are stored in the data base 123 of the third temporary parent wireless terminal 100-6 at the same time. The third parent wireless terminal 100-6 produces the reception electric field strength data sequence (d) of the data base 123, as shown in FIG. 11. In the reception electric field strength data sequence (d), the minimum value of the reception electric field strength data is selected based on the reception electric field strength data sequences (a), (b) and (c) for each of the child wireless terminals 100-1 to 100-10.

Three of the wireless terminals 100-1 to 100-10 are selected to have the largest reception electric field strength data in order from the reception electric field strength data sequence (d) of this data base 123. In the example which is shown in FIG. 7, the wireless terminals 100-1 to 100-3 have the reception electric field strength levels of 53 dB, 35 dB and 33 dB which are is in a larger order in the reception electric field strength data sequence (d). The reception electric field strength levels are surrounded by dotted lines. The wireless terminals 100-1 to 100-3 in an area 111 are selected as the final candidates of the parent wireless terminals which form an optimal service area to the other child wireless terminal 100-4 to 100-10.

In this case, as shown in FIG. 7, the reception electric field strength between the child wireless terminal 100-1 and the temporary parent wireless terminal 100-4 is 60 dB, the reception electric field strength between the child wireless terminal 100-1 and the temporary parent wireless terminal 100-8 is 54 dB, and the reception electric field strength between the child wireless terminal 100-1 and the temporary parent wireless terminal 100-6 is 53 dB. There, the wireless terminal 100-1 is selected as the true parent wireless terminal.

Next, the operation of the ad hoc network system in the second embodiment will be described. FIGS. 10A and 10B are flow charts which show the processing procedure of the operation of the ad hoc network system.

First, in S201 step, in all the wireless terminals 100-1 to 100-10, it is recognized based on the control program read from the RAM 302 by the CPU 301 and the boot program read from the ROM 303 by the CPU 301 that a power supply is turned on, and the wireless terminals 100-1 to 100-10 are set as the child wireless terminals in the test mode. Then, they enter the reception state waiting for the parent wireless terminal change request with the following step S202.

When the parent wireless terminal change request is not received (No), whether the parent wireless terminal is set to the parent wireless terminal from the input unit 125 is determined in a step S203. When the parent wireless terminal is determined not to be set to the parent wireless terminal (No), the electric field strength measuring unit 308 waits for the reception electric field strength notifying request through the antenna 19 in a step S204.

When the wireless terminal is set to the parent wireless terminal from the input unit 125 in the step S203 (Yes), the CPU 301 controls in such a manner that the wireless terminal (anyone of 100-1 to 100-10), e.g., the wireless terminal 100-4 is set to the first temporary parent wireless terminal in the test mode in a step S205. At the same time, the parent wireless terminal controlling unit 119 is activated.

Next, the first temporary parent wireless terminal 100-4 transmits the own wireless terminal identifier with the wireless communication through the wireless adapter 17 and the antenna 19. At the same time, the first temporary parent wireless terminal 100-4 transmits the reception electric field strength notifying request to the other wireless terminals 100-1 to 100-3 and 100-5 to 100-10 in the wireless communication in a step S206. In this case, when being set as the child wireless terminals, the wireless terminals 100-1 to 100-3 and 100-5 to 100-10 receive the reception electric field strength notifying request is received in a step S204. When the reception electric field strength notifying request is received in the step S204 (Yes), the reception electric field strength measuring unit 121 of each child wireless terminal measures the reception electric field strength in a step S207, when a test signal generated by the test signal generating unit 112 of the parent wireless terminal 100-4 is received from the first temporary parent wireless terminal 100-4 in the test mode.

Next, in a step S208, the measurement result of the reception electric field strength is transmitted to the first parent wireless terminal 100-4 through the wireless adapter 17 and the antenna 19 in the wireless communication. When the reception electric field strength data is received from the child wireless terminal in a step S209 (Yes), the received reception electric field strength data is stored in the data base 123, which is stored in the RAM 16, as the reception electric field strength data sequence (a) in a step S210.

The wireless transmission of the reception electric field strength data is waited from all the child wireless terminals in a step S211. When a predetermined time period as the reception wait time period elapses in the step S211, it is determined in a step S22 whether or not the collection of the reception electric field strength data from all the child wireless terminals is completed.

When the collection of the reception electric field strength data has not yet completed (No), the parent wireless terminal selecting unit 118 selects the wireless terminal 100-8 as the second parent wireless terminal based on the data base 123. In this case, since only the reception electric field strength data sequence (a) is collected, the wireless terminal 100-8 is selected based on the reception electric field strength data sequence (a) in a step S213. The wireless terminal 100-8 has a minimum value of the reception electric field strength data sequence (a).

When the collection operation is executed twice or more, the wireless terminal which has the minimum value among addition values of the reception electric field data sequences from the first parent wireless terminal to the current parent wireless terminal for each of the child wireless terminals is selected as the next parent wireless terminal. For example, when the wireless terminal 100-8 is set as the parent wireless terminal, the wireless terminal 100-6 is selected as the next parent wireless terminal, because the addition value for the wireless terminal 100-6, i.e., (20+24 dB) is the smallest.

In a step S214, the wireless communication is performed to the other wireless terminals through the wireless adapter 17 and the antenna 19 such that the change from the first parent wireless terminal to the second parent wireless terminal is performed.

Then, in a step S215, the reception electric field strength data sequence (a) which is stored in the data base 123 is transmitted in the wireless communication to the second temporary parent wireless terminal 100-8 through the wireless adapter 17 and the antenna 19. As a result, the first parent wireless terminal is once more set to the child wireless terminal in the test mode in a step S201.

In the second temporary parent wireless terminal 100-8, when the parent wireless terminal change request is received in a step S202 (Yes), it is set to the reception wait state of the reception electric field strength data in a step S217.

When receiving the reception electric field strength data (Yes), the reception electric field strength data is stored in the data base 123 of the second parent wireless terminal 100-8 as a reception electric field strength data sequence (b) in the step S210, as shown in FIG. 11.

The M temporary parent wireless terminals (M is an integer more than 1), for example, the child wireless terminals 100-4, 100-8, and 100-6 collect the reception electric field strength data sequences as the first to third temporary parent wireless terminals (Yes) in the step S212. The minimum value of the reception electric field strength data collected by the first to third temporary parent wireless terminals 100-4, 100-8, and 100-6 is selected for every child wireless terminal 100-1 to 100-10 with reference to the data base 123 shown in FIG. 11 in a step S219. Further, the N wireless terminals (N is an integer more than 1) are selected as the candidates of the parent wireless terminals in order from the wireless terminal having the largest value of the reception electric field strength data.

In this example, three wireless terminals 100-1 to 100-3 are selected as the final candidates of the parent wireless terminals in the data base 123, because the wireless terminals 100-1 to 100-3 have the reception electric field strength levels of 53 dB, 35 dB and 33 dB which are higher than the other values. In a step S220, it is notified to the wireless terminals 100-4 to 100-10 that these wireless terminal are selected as the parent wireless terminal candidates. Then, the other wireless terminals 100-4 to 100-10 are set to the child wireless terminals.

Finally, the wireless terminal 100-1 having the smallest reception electric field strength level of 53 dB is selected as the true parent wireless terminal.

In this manner, data transfer and so on can be performed in the parent wireless terminal intervening communication system. It should be noted that these processing data are displayed on the screen by the display unit 15 and are notified to the user.

In this test mode, a plurality of optimal candidates of the parent wireless terminal are selected using the reception electric field strength levels. However, the data error rate may be used. That is, when a test signal which is used to measure the reception electric field strength data in the child wireless terminal are returned to the parent wireless terminal, the error rate of the test signal returned from the child wireless terminal data may be detected. In this case, this data error rate may be used for the final selection of the parent wireless terminal in place of the reception electric field strength. Otherwise, the data error rate and the reception electric field strength are in the relation of inverse proportion.

As described above, one of the features of the ad hoc network of the present invention is in that the optimal wireless terminal as the parent wireless terminal can be selected from the plurality of wireless terminals. As a result, there is an effect that even if a special parent wireless terminal is not previously provided, it can be prevented that the operation speed of the whole network becomes late because of the transmission rate of the parent wireless terminal and the network connection time becomes short because of lack of the battery remaining power quantity of the parent wireless terminal.

Also, according to the ad hoc network system of the present invention, each of the temporary parent wireless terminals in the test mode collects the reception electric field strength data from the other wireless terminals. Based on this collection results, the wireless terminal located on the communication position which forms the optimal service area to the plurality of child wireless terminals is selected as the final candidate of the parent wireless terminal. As a result, in the case that the number of wireless terminals increases, the wireless terminal of the optimal communication position can be selected as the final candidate of the parent wireless terminal for a short time with a simple procedure.

What is claimed is:

1. A method of configuring an ad hoc network system including a plurality of wireless terminals, comprising the steps of:

(a) selecting at least one of a plurality of wireless terminals of a network as a current temporary parent wireless terminal, all of the plurality of wireless terminals other than said current temporary parent wireless terminal being set as child wireless terminals;

(b) collecting a set of state determination data from each of said child wireless terminals by said current temporary parent wireless terminal, said state determination data including at least one of a wireless terminal state data of each of said child wireless terminals and a communication state data with each of said child wireless terminals;

(c) determining whether said step (b) is executed K cycles (K is a positive integer);

(d) when it is determined in said step (c) that said step (b) is not yet executed K cycles, setting said current temporary parent wireless terminal as a previous temporary parent wireless terminal, and newly selecting at least one of said child wireless terminals as said current temporary parent wireless terminal based on said sets of state determination data for said child wireless terminals during the executed cycles of said step (b) such that said current temporary parent wireless terminal executes said step (b), said previous temporary parent wireless terminal and said child wireless terminals other than said current temporary parent wireless terminal being set as said child wireless terminals; and (e) when it is determined in said step (c) that said step (b) is executed K cycles, determining one of said child wireless terminals as a true parent wireless terminal by said current temporary parent wireless terminal based on said state determination data for said child wireless terminals for the K cycles.

2. A method according to claim 1, wherein said step (a) includes:

designating at least one of said plurality of wireless terminals as current temporary parent wireless terminal;

setting said plurality of wireless terminals other than said current temporary parent wireless terminal to said child wireless terminals; and broadcasting an identifier of said current temporary parent wireless terminal to said child wireless terminals.

3. A method according to claim 2, wherein said step (a) further includes:

after said current temporary parent wireless terminal and said child wireless terminals are set, establishing synchronization between said current temporary parent wireless terminal and each of said child wireless terminals; and after the synchronization is established, transmitting an identifier of each of said child wireless terminals to said current temporary parent wireless terminal as a connection request.

4. A method according to claim 1, wherein said step (b) includes:

collecting at least one of a remaining battery power quantity data as the wireless terminal state data and a transmission rate data, an error rate data and an electric field strength data as the communication state data to produce said state determination data.

5. A method according to claim 1, wherein said step (b) includes:

broadcasting a state determination data notifying request from said current temporary parent wireless terminal to said child wireless terminals;

detecting a remaining battery power quantity in each of said child wireless terminals to produce a remaining battery power quantity data;

transmitting said remaining battery power quantity data as said wireless terminal state data from each of said child wireless terminals to said current temporary parent wireless terminal; and storing said set of remaining battery power quantity data collected from said child wireless terminal in a data base.

6. A method according to claim 1, wherein said step (b) includes:

broadcasting a test data to said child wireless terminals;

returning the test data from each of said child wireless terminals to said current temporary parent wireless terminal;

detecting a transmission rate of communication with each of said child wireless terminals by said current temporary parent wireless terminal to produce a transmission rate data as said communication state data; and storing said set of transmission rate data collected from said child wireless terminals in a data base.

7. A method according to claim 1, wherein said step (b) includes:

broadcasting a test data to said child wireless terminals;

returning the test data from each of said child wireless terminals to said current temporary parent wireless terminal;

detecting an error rate of communication with each of said child wireless terminals to produce an error rate data as said communication state data; and storing said set of error rate data collected from said child wireless terminals in a data base.

8. A method according to claim 1, wherein said step (b) includes:

broadcasting a test data from each of said current temporary parent wireless terminals to said child wireless terminals;

detecting electric field strength when the test data is received, in each of said child wireless terminals to produce an electric field strength data as said communication state data;

transmitting said electric field strength data from each of said child wireless terminals to said current temporary parent wireless terminal corresponding to the test data; and storing said set of electric field strength data collected from said child wireless terminals in a data base.

9. A method according to claim 8, wherein said step (b) includes:

summing of electric field strength data for the executed cycles for each of said child wireless terminals; and designating at least one of said child wireless terminals as said current temporary parent wireless terminal based on the summing results for said child wireless terminals.

10. A method according to claim 1, wherein said step (d) includes:

selecting at least one of said child wireless terminals as said current temporary parent wireless terminal based on said sets of state determination data for said child wireless terminals for the executed cycles of said step (b);

broadcasting an identifier of said current temporary parent wireless terminal to said child wireless terminals;

comparing the transmitted identifier and an own identifier in each of said child wireless terminals;

setting the child wireless terminal to said current temporary parent wireless terminal when the transmitted identifier and the own identifier are coincident with each other in each of said child wireless terminals;

broadcasting a data base to said child wireless terminals, said data base storing said state determination data for said child wireless terminals obtained when said step (b) has been already executed, as said sets of state determination data for the executed cycles of said step (b); and storing said data base therein by said current temporary parent wireless terminal.

11. A method according to claim 9, wherein said step (e) includes:

referring to said data base to select a minimum value from among the state determination data obtained when said step (b) is executed K cycles, for each of said plurality of wireless terminals; and designating as said true parent wireless terminal one of said plurality of wireless terminals having a maximum value of said minimum values.

12. A method according to claim 1, wherein said state determination data is a remaining battery power quantity data and a transmission rate data, and wherein said step (e) includes:

designating as said true parent wireless terminal one of said plurality of wireless terminals having the highest transmission rate and the remaining battery power quantity data more than a predetermined value.

13. A method according to claim 12, wherein said step (a) includes selecting at least one of said plurality of wireless terminals of the network as said current temporary parent wireless terminal in response to a parent wireless terminal change request, and wherein said method further comprises the step of issuing said parent wireless terminal change request when the remaining battery power quantity becomes less than the predetermined value.

14. A method according to claim 1, further comprising the steps of:

broadcasting a sync signal for establishing synchronization between said true parent wireless terminal and each of the other wireless terminal;

transmitting an identifier of each of the other wireless terminals to said true parent wireless terminal; and setting a flag for the transmitted identifier in a data base.

15. An ad hoc network system comprising a plurality of wireless terminals, each of which comprises:

a setting unit for setting said wireless terminal to a current temporary parent wireless terminal or a true parent wireless terminal when a parent terminal instruction is received, and to a child wireless terminals when a parent terminal instruction is not received;

a data collecting unit for collecting a set of state determination data from each of said child wireless terminals when said wireless terminal is set to said current temporary parent wireless terminal, said state determination data including at least one of a wireless terminal state data of each of said child wireless terminals and a communication state data with each of said child wireless terminals; and a parent wireless terminal selecting unit for selecting at least one of said child wireless terminals as a current temporary parent wireless terminal based on already collected sets of state determination data for said child wireless terminals, and selecting one of said child wireless terminals as a true temporary parent wireless terminal based on already collected sets of state determination data for said child wireless terminals, when the collecting operation is repeated K cycles (K is a positive integer), and for broadcasting said parent terminal instruction to said child wireless terminals.

16. An ad hoc network system according to claim 15, wherein said setting unit includes:

an informing unit for broadcasting an identifier of said current temporary parent wireless terminal to said child wireless terminals when at least one of said plurality of wireless terminals or said child wireless terminals is selected as said current temporary parent wireless terminal.

17. An ad hoc network system according to claim 16, wherein said setting unit further includes:

a synchronization establishing unit for establishing synchronization with said current temporary parent wireless terminal or said true parent wireless terminal when said wireless terminal is set to said child wireless terminal;

an own identifier storing unit for storing an identifier of said wireless terminal; and a transmitting unit for transmitting the own identifier of said wireless terminal from said own identifier storing unit to said current temporary parent wireless terminal or said true parent wireless terminal as a connection request.

18. An ad hoc network system according to claim 15, wherein said state determination data is at least one of a remaining battery power quantity data as the wireless terminal state data and a transmission rate data, an error rate data and an electric field strength data as the communication state data to produce said state determination data.

19. An ad hoc network system according to claim 15, wherein said data collecting unit includes:

an informing unit for broadcasting a state determination data notifying request to said child wireless terminals;

a data base; and a storing unit for storing said set of state determination data from said child wireless terminals in said data base.

20. An ad hoc network system according to claim 19, wherein said data collecting unit includes:

a detecting unit for detecting a remaining battery power quantity to produce a remaining battery power quantity data; and a transmitting unit for transmitting said remaining battery power quantity data as said wireless terminal state data to said current temporary parent wireless terminal in response to said state determination data notifying request when said wireless terminal is set to said child wireless terminal.

21. An ad hoc network system according to claim 19, wherein said data collecting unit includes:

a test data generating unit for generating a test data when said wireless terminal is set to said current temporary parent wireless terminal;

a communication unit for broadcasting said test data to said child wireless terminals when said wireless terminal is set to said current temporary parent wireless terminal, for returning the test data to said current temporary parent wireless terminal when said wireless terminal is set to said child wireless terminal, and for receiving said test data from each of said child wireless terminals; and a detecting unit for detecting a transmission rate of communication with each of said child wireless terminals from the received test data to produce a transmission rate data as said communication state data.

22. An ad hoc network system according to claim 19, wherein said data collecting unit includes:

a test data generating unit for generating a test data when said wireless terminal is set to said current temporary parent wireless terminal;

a transmitting and receiving unit for broadcasting said test data to said child wireless terminals when said wireless terminal is set to said current temporary parent wireless terminal, for returning the test data to said current temporary parent wireless terminal when said wireless terminal is set to said child wireless terminal, and for receiving said test data from each of said child wireless terminals; and a detecting unit for detecting an error rate of communication with each of said child wireless terminals from the received test data to produce an error rate data as said communication state data.

23. An ad hoc network system according to claim 15, wherein said data collecting unit includes:

a test unit for generating a test data when said wireless terminal is set to said current temporary parent wireless terminal;

a communication unit for broadcasting said test data to said child wireless terminals; and a detecting unit for detecting electric field strength when said test data received from said current temporary parent wireless terminal to produce an electric field strength data as said communication state data, and wherein said communication unit transmits said electric field strength data to said current temporary parent wireless terminal.

24. An ad hoc network system according to claim 23, wherein said parent wireless terminal selecting unit further sums of electric field strength data for the executed cycles of the collection operation for each of said child wireless terminals, and issues said parent terminal instruction for designating at least one of said child wireless terminals as said current temporary parent wireless terminal based on the summing results for said child wireless terminals.

25. An ad hoc network system according to claim 15, wherein said parent wireless terminal selecting unit broadcasts an identifier of said current temporary parent wireless terminal to said child wireless terminals, and broadcasts a data base to said child wireless terminals, said data base storing said set of state determination data for said child wireless terminals obtained when the collecting operation has been executed, and wherein said setting unit compares the transmitted identifier and an own identifier in each of said child wireless terminals, sets said wireless terminal to said current temporary parent wireless terminal when the transmitted identifier and the own identifier are coincident with each other, and stores said data base therein by said current temporary parent wireless terminal.

26. An ad hoc network system according to claim 24, wherein said parent wireless terminal selecting unit refers to said data base to select a minimum value of said state determination data for each of said plurality of wireless terminals when the collecting operation is executed K cycles, and designates, as said true parent wireless terminal, one of said plurality of wireless terminals having a maximum value of said minimum values.

27. An ad hoc network system according to claim 15, wherein said state determination data is a remaining battery power quantity data and a transmission rate data, and wherein said parent wireless terminal selecting unit includes designates, as said true parent wireless terminal, one of said plurality of wireless terminals having the highest transmission rate and the remaining battery power quantity data more than a predetermined value.

28. An ad hoc network system according to claim 27, wherein said parent wireless terminal selecting unit issues said parent terminal instruction when the remaining battery power quantity of the own true parent wireless terminal becomes less than the predetermined value.

* * * * *